United States Patent [19]
Labrie et al.

[11] Patent Number: 5,941,558
[45] Date of Patent: Aug. 24, 1999

[54] APPARATUS FOR DEPLOYING AN AIRBAG THROUGH A HARD PANEL

[75] Inventors: Craig B. Labrie, Dover, N.H.; Jimmy C. Rogers, Berwick, Me.; John D. Gray, Union, N.H.; Bruce A. Batchelder, Lee, N.H.; Michael J. Gallagher, Hampton, N.H.; Richard D. Rhodes, Jr., Somersworth, N.H.

[73] Assignee: Textron Automotive Company Inc., Troy, Mich.

[21] Appl. No.: 08/949,842

[22] Filed: Oct. 14, 1997

Related U.S. Application Data

[63] Continuation-in-part of application No. 08/871,243, Jun. 9, 1997, abandoned.

[51] Int. Cl.$^6$ .................................................. B60R 21/20
[52] U.S. Cl. ........................................ 280/728.3; 280/732
[58] Field of Search .............................. 280/728.3, 732, 280/728.2, 730.1, 730.2, 752, 728.1

[56] References Cited

U.S. PATENT DOCUMENTS

| | | |
|---|---|---|
| 4,893,833 | 1/1990 | DiSalvo et al. . |
| 4,911,471 | 3/1990 | Hirabayashi ............................ 280/732 |
| 5,072,967 | 12/1991 | Batchelder et al. ..................... 280/732 |
| 5,330,223 | 7/1994 | Hiramitsu et al. ................... 280/728.3 |
| 5,385,366 | 1/1995 | Frank et al. ......................... 280/728.3 |
| 5,472,228 | 12/1995 | Bentley et al. . |
| 5,533,746 | 7/1996 | Whited . |
| 5,564,731 | 10/1996 | Gallagher et al. . |
| 5,738,366 | 4/1998 | Phillion ............................... 280/728.3 |

FOREIGN PATENT DOCUMENTS

| | | | |
|---|---|---|---|
| 5-185896 | 7/1993 | Japan ...................................... 280/752 |
| 5-185897 | 7/1993 | Japan ...................................... 280/752 |

*Primary Examiner*—Peter C. English
*Attorney, Agent, or Firm*—Reising, Ethington, Barnes, Kisselle, Learman & McCulloch, P.C.

[57] ABSTRACT

An apparatus for deploying an air bag through an automotive dash panel includes an air bag door integrally formed in the panel and defined by a frangible edge of reduced cross section. A dispenser supports the air bag behind the door. A metal reaction plate is positioned between the air bag and the door. When the air bag inflates it forces the reaction plate to bend around a horizontal hinge line. As the reaction plate rotates it concentrates inflation force along a lower portion of the frangible door edge. This helps predictably separate the door from the dash panel by tearing along the lower door edge and allowing the tear to propagate up two side edges. In one embodiment, the tear also propagates across an upper edge to completely separate the door from the panel. At least one, and preferably two or three tethers limit how far the door can travel during air bag inflation. A stop member may be included to limit reaction plate bending. After deployment, the reaction plate remains in a position that prevents the door from returning to its original position.

47 Claims, 12 Drawing Sheets

APPARATUS FOR DEPLOYING AN AIRBAG THROUGH A HARD PANEL

This application is a Continuation in Part of U.S. patent application Ser. No. 08/871,243 filed Jun. 9, 1997, attorney docket number P-755, now abandoned.

TECHNICAL FIELD

This invention relates generally to a passive supplemental inflatable restraint (PSIR) system having a PSIR door that is integrally formed with an instrument panel and, more particularly, to such a system having a PSIR door integrally formed with a hard first-surface instrument panel.

BACKGROUND OF THE INVENTION

A passive supplemental inflatable restraint system having a PSIR door that is integrally formed into an automotive vehicle instrument panel must also include some provision for guiding or otherwise facilitating the opening and partial separation of that PSIR door from the instrument panel that it is integrally formed with. This is particularly true of PSIR doors that are integrally formed into hard first-surface instrument panels. The "first-surface" of a panel is the cosmetic exterior surface that would be visible to a vehicle occupant. Hard first-surface panels are typically formed by injection molding one or more plastic materials.

To close air bag deployment openings in hard first-surface instrument panels, many current PSIR systems use a separate "add-on" PSIR door. One reason that current PSIR systems add on a separate PSIR door in such applications is because it is difficult to cause a tear seam to break and/or tear in a predictable way under the sudden shock of a deploying air bag. Even when weakened, a tear seam that integrally joins a PSIR door and a surrounding instrument panel can fracture in a ragged unpredictable manner that can affect air bag deployment.

One example of a hard first-surface system is disclosed in U.S. Pat. No. 5,472,228 assigned to Morton International and issued Dec. 5, 1995. This patent discloses a reinforced hard door with a reaction plate. When the air bag deploys, the reaction plate forces the door in a direction that will break weakened fasteners securing the door to an instrument panel.

Another of Morton's hard door concepts is shown in U.S. Pat. No. 5,533,746, issued Jul. 9, 1996. This system includes a reaction plate with reinforced lands. When the air bag deploys, it acts upon the reaction plate to cause hold down attachment rods to release from clips.

What is needed is an apparatus that, in response to air bag deployment, helps separate and open a PSIR door that is integrally formed into an instrument panel. What is also needed is such an apparatus that helps separate and open a PSIR door that is integrally formed into a hard first-surface instrument panel.

SUMMARY OF THE INVENTION

A passive supplemental restraint apparatus 10, 10', 10", 10s for an automotive vehicle comprises an interior vehicle panel 12, 12', 12", 12s and an air bag deployment door 16, 16', 16", 16s integrally formed in the vehicle panel 12, 12', 12", 12s. The air bag deployment door 16, 16', 16", 16s has a perimeter, at least a portion of which is defined by a frangible marginal edge 18, 18', 18", 18s. An air bag dispenser 20, 20', 20", 20s is supported adjacent a door inner surface 38, 38', 38", 38s opposite a door outer surface 22, 22', 22", 22s. An air bag 24, 24', 24", 24s is supported in an air bag receptacle 26, 26', 26", 26s of the air bag dispenser 20, 20', 20", 20s. The air bag 24, 24', 24", 24s has an inner end 27, 27', 27", 27s operatively connected to the air bag dispenser 20, 20', 20", 20s and an outer end 30, 30', 30", 30s disposed adjacent the air bag deployment door 16, 16', 16", 16s. Characterizing the invention is a reaction plate 28, 28', 28", 28s disposed between the air bag 24, 24', 24", 24s and the air bag deployment door 16, 16', 16", 16s.

The present invention is different from prior art passive supplemental restraint systems in that it includes a reaction plate positioned to receive the force of air bag deployment from the dispenser 20, 20', 20", 20s. The reaction plate then directs and distributes that force against the door inner surface 38, 38', 38", 38s. In this way the reaction plate concentrates air bag opening forces along the frangible marginal edge 18, 18', 18", 18s of the door 16, 16', 16", 16s causing the door 16, 16', 16", 16s to separate from the vehicle panel 12, 12', 12", 12s along the frangible marginal edge 18, 18', 18", 18s.

BRIEF DESCRIPTION OF THE DRAWINGS

To better understand and appreciate the invention, refer to the following detailed description in connection with the accompanying drawings:

FIG. 8 is a cross sectional view of a heat-stake pin of the passive restraint system of FIGS. 1–3;

DETAILED DESCRIPTION OF THE PREFERRED EMBODIMENT

Figure 1:
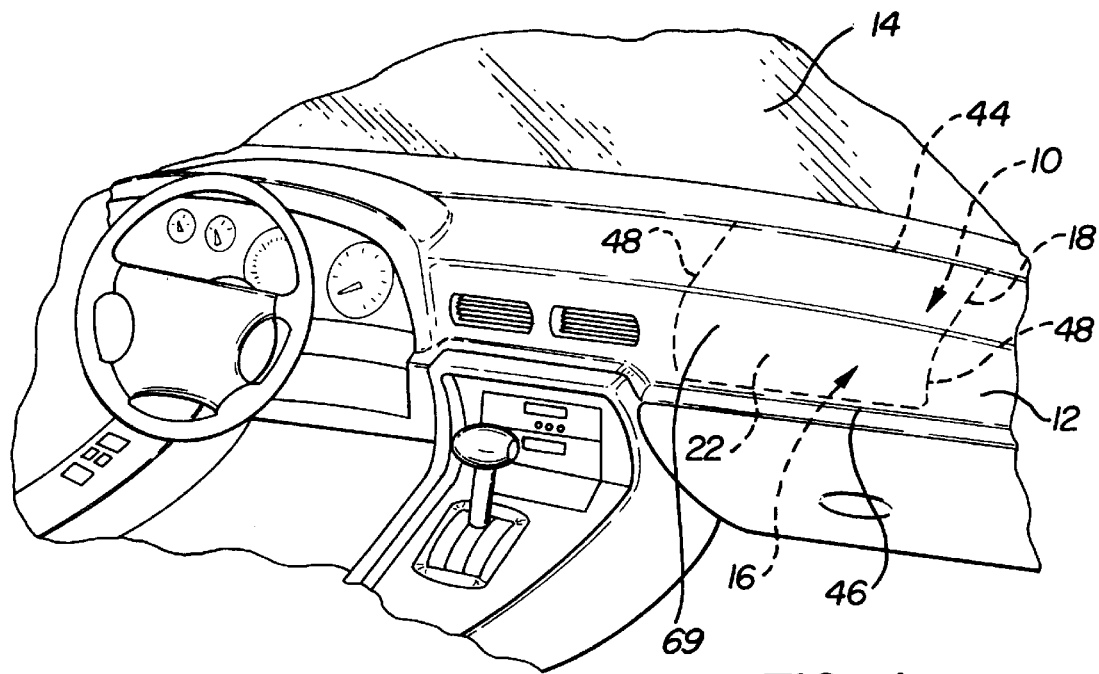
FIG. 1 is a perspective view of a first passive restraint system constructed according to the present invention and installed in a vehicle dash panel.
Figure 2:
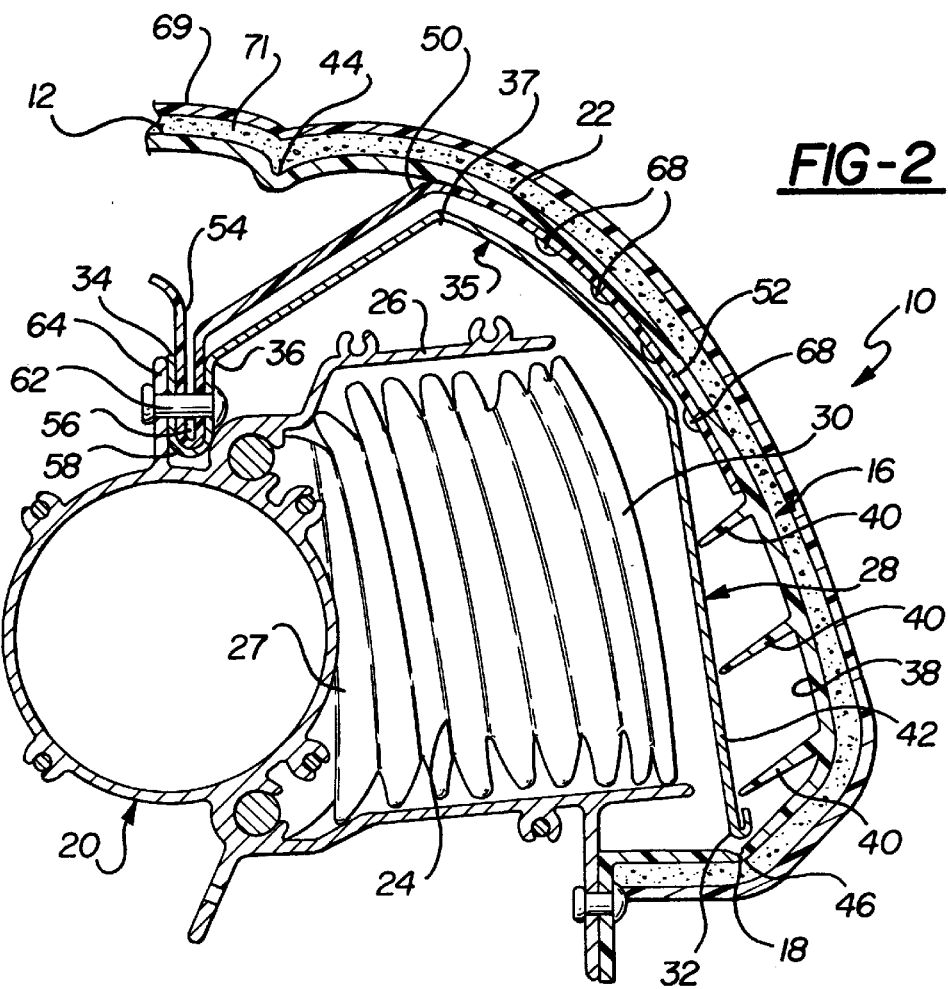
FIG. 2 is a cross-sectional end view of the passive restraint system of FIG. 1.
Figure 3:
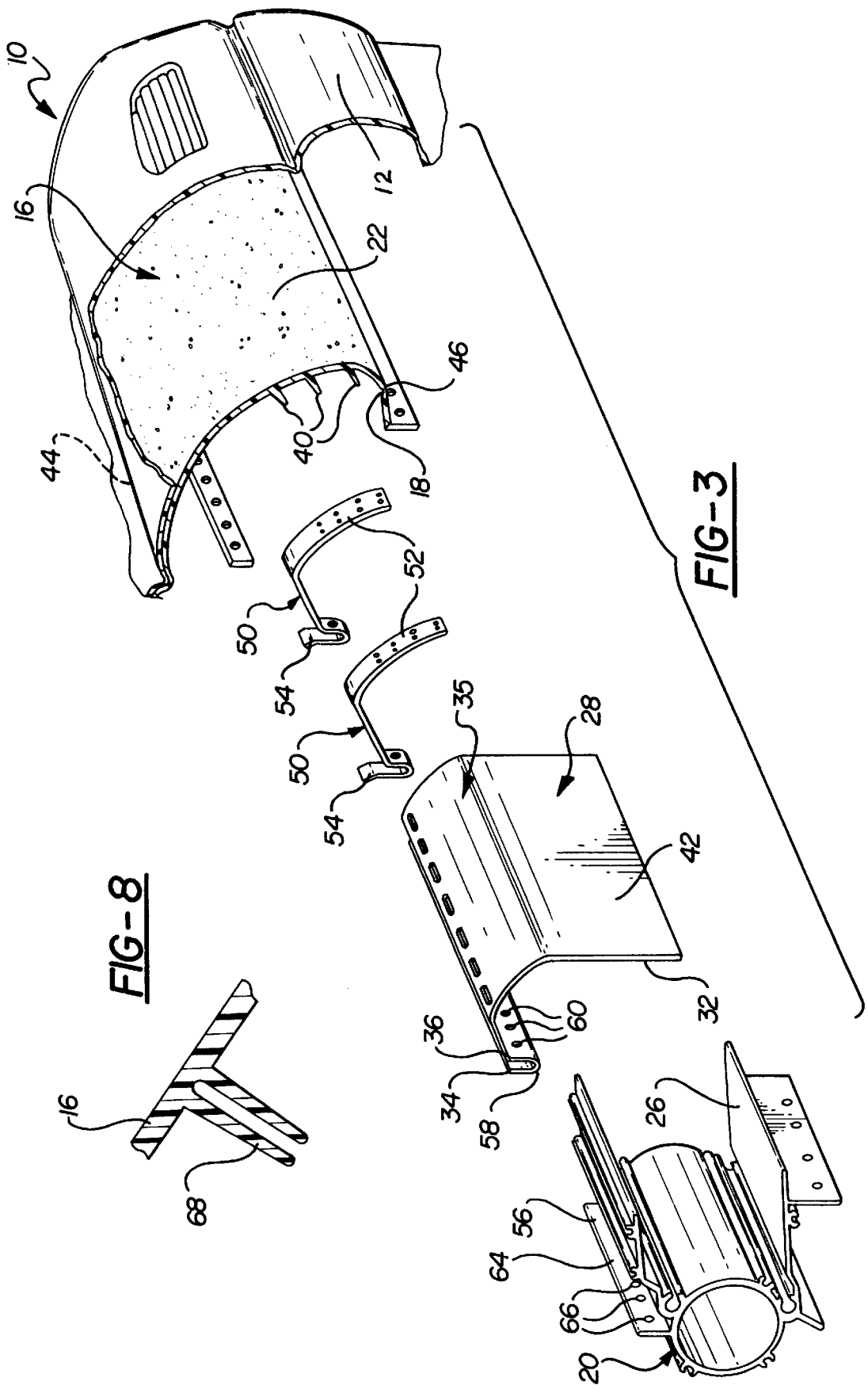
FIG. 3 is an exploded view of the passive restraint system of FIG. 1.

A first embodiment of a passive supplemental restraint apparatus for an automotive vehicle is generally indicated at 10 in FIGS. 1–3. A second embodiment is generally indicated at 10' in FIGS. 4–7. A third embodiment is generally indicated at 10" in FIGS. 9–11. Reference numerals with the designation prime (') in FIGS. 4–7 and double prime (") in FIGS. 9–11 indicate alternative configurations of elements that also appear in the first embodiment. Where a portion of the following description uses a reference numeral to refer to the figures, we intend that portion of the description to apply equally to elements designated by primed numerals in FIGS. 4–7 and double-primed numerals in FIGS. 9–11.

Figure 17:
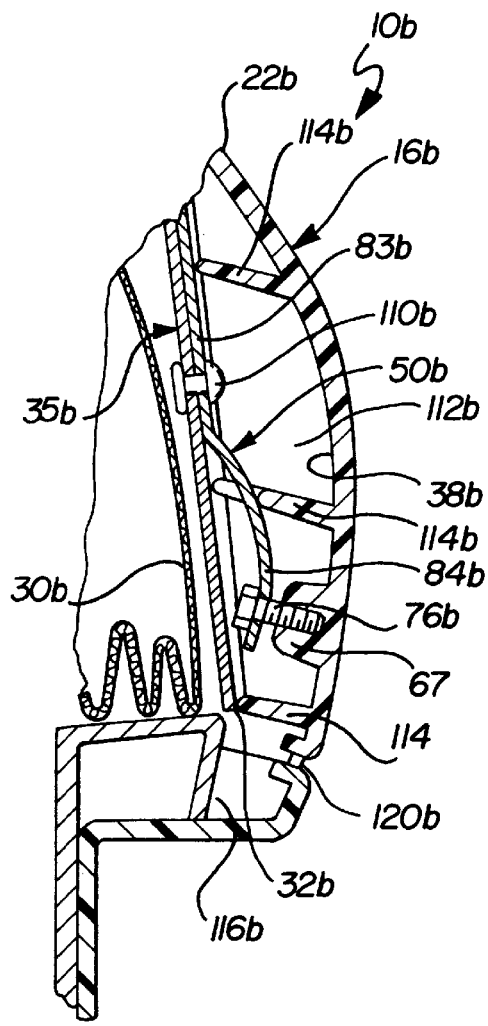
FIG. 17 is a partial cross-sectional view of the passive restraint system of FIGS. 9–11 including an alternative tether attachment construction.

An alternative construction of the third embodiment is generally indicated at 10b in FIG. 17. Reference numerals with the suffix "b" in FIG. 17 indicate elements of FIG. 17 that correspond to similar or identical elements shown in FIGS. 9–11. Where a portion of the description of the third embodiment uses a reference numeral to refer to the figures, we intend that portion of the description to apply equally to elements designated by the suffix "b" in FIG. 17.

In FIG. 1 the passive supplemental restraint apparatus is shown hidden behind an automotive vehicle passenger-side dash panel 12 below a windshield 14 of the vehicle. As shown in FIG. 2, the apparatus includes the panel 12, and an air bag deployment door 16 integrally formed in the panel 12 and having a perimeter defined, in part, by a hidden marginal edge 18. The perimeter may, also be defined as the lateral boundary of the door 16—the door 16 being defined as that portion of the integrally formed panel 12 and door 16 that is separable or bendable from the panel 12 under the force of air bag inflation. The door 16 and the vehicle dash panel 12 are integrally formed as a single unitary piece.

As shown in FIGS. 2 and 3, an air bag dispenser assembly 20 is supported behind the door 16, i.e., on a side of the door 16 opposite a door outer surface 22. The dispenser 20 is also disposed adjacent and aligned with the air bag deployment door 16. As is best shown in FIG. 2, the air bag dispenser 20 is configured to direct air bag deployment along a deployment path through the door 16 of the vehicle panel 12, the air bag deployment path being the path that the air bag will travel along as it inflates during deployment. The air bag deployment path is best exemplified by the respective areas occupied by the inflated air bags shown at 24' in FIG. 7, 24" in FIG. 11, and at 24s in FIGS. 13 and 15. The dispenser 20 may be any suitable type of air bag dispenser to include, for example, the dispenser described in U.S. Pat. No. 5,564,731 and incorporated herein by reference.

An air bag 24 is supported in an air bag receptacle 26 of the air bag dispenser 20 and is operatively connected to the air bag dispenser 20 at an open end 27 of the air bag 24. A closed outer end 30 of the air bag 24 is disposed adjacent the air bag 24 deployment door 16.

As is best shown in FIG. 2, a rigid metal reaction plate 28 is disposed between the air bag 24 and the air bag deployment door 16. The reaction plate 28 receives the force of air bag deployment when the air bag 24 inflates and expands out of the dispenser 20. The reaction plate 28 directs and distributes that force across the door 16 to predictably separate the door 16 from the panel 12 along the hidden marginal edge 18 of the door 16. By distributing the air bag 24 opening force across the door 16 the reaction plate 28 also serves to prevent air bag 24 opening forces from concentrating in other locations on the door 16 that might result in door 16 or panel 12 fractures and/or fragmentation.

In the present embodiment, the reaction plate 28 is positioned to concentrate air bag opening forces along a portion of the hidden marginal edge 18 that extends along the forward marginal edge 46 of the door 16. The reaction plate 28 is positioned in this way to initiate marginal edge tearing at the forward marginal edge 46 and then allow the tearing to propagate upward along the two side edges of the door 16. Alternatively, marginal edge tearing may be initiated at the forward marginal edge 46 and along the two side edges virtually simultaneously. The reaction plate 18 is preferably made of cold rolled steel but may be made from any other material having suitable bending and force-distributing characteristics.

As is best shown in FIG. 3, the reaction plate 28 includes a reaction plate outer marginal edge 32 having a shape generally identical to that of the hidden marginal edge 18 of the air bag deployment door 16. The reaction plate marginal edge 32 is aligned with the hidden marginal edge 18 of the air bag deployment door 16 to concentrate air bag 24 inflation stress along the hidden marginal edge 18 of the air bag deployment door 16.

As shown in FIG. 2, the reaction plate 28 is pivotally attached along a reaction plate inner edge 34 to the air bag dispenser apparatus 20. However, in other embodiments, the reaction plate 28 may be pivotally attached to a portion of the panel 12 or other surrounding support structures. An outer pivotable portion of the reaction plate 28, generally indicated at 35 in FIGS. 2 and 3, is outwardly and upwardly pivotable away from the air bag dispenser 20. The outer reaction plate portion 35 pivots by bending along a first horizontal hinge line 36 of the reaction plate 28 that extends parallel to and adjacent the rigidly attached inner plate edge 34. The hinge line 36 defines a marginal inner edge of the outer portion 35 of the reaction plate. A pivotable lower panel portion 42 of the reaction plate also pivots by bending along a second horizontal hinge line 37 of the reaction plate 28 that extends parallel to the first hinge line 36. The force of an inflating air bag causes the outer portion 35 of the reaction plate 28, which includes the pivotable lower panel portion 42 of the reaction plate 28, to pivot outward. The pivotable lower panel portion 42 of the reaction plate 28 will then continue pivoting into a position angularly spaced from the air bag deployment path and more than 45 degrees from its position before air bag deployment. Examples of such an angularly spaced position of the lower panel portions of reaction plates are shown by reference to lower panel portions 42' and 42" in FIGS. 7 and 11, respectively.

As shown in FIG. 2, the outer portion 35 of the reaction plate 28 is disposed adjacent a door inner surface 38 and opposite the outer door surface 22. As is best shown in FIG. 2, the outer portion 35 and, therefore, the pivotable lower panel portion 42 of the reaction plate 28 are separate from the door 16. This allows the outer portion 35 and pivotable lower panel portion 42 of the reaction plate 28 to move independently of the door 16 following door separation. This prevents the outer portion 35 of the reaction plate 28 from arresting or restricting the opening motion of the door 16. Three horizontal ribs, shown at 40 in FIGS. 2 and 3, extend integrally inward from the door inner surface 38 to a point adjacent the pivotable lower panel portion 42 of the outer portion 35 of the reaction plate as shown in FIGS. 2 and 3. The ribs 40 space the reaction plate lower panel 42 from the door inner surface 38. The ribs 40 allow the reaction plate 28 to be positioned in a plane that is generally perpendicular to the direction of air bag 24 deployment while remaining in close proximity to the door 16. The ribs 40 also allow the door 16 to be designed with outer contours that do not necessarily correspond to the reaction plate 28 configuration. In other embodiments the ribs 40 may be of any suitable configuration and orientation known in the art.

As shown in FIGS. 1–3, the air bag deployment door 16 has a curved rectangular shape defined by relatively straight aft 44 and forward 46 marginal edges and a pair of arcuate side marginal edges 48. The forward 46 and side 48 edges comprise a frangible region of reduced cross section. The rear edge 44 may comprise a styling seam or groove intended to define the rear edge 44 of the door 16. In other embodiments the rear edge 44 may be hidden or there may be no "rear edge". In other words, the transition from the door to the panel 12 may be uninterrupted.

Where a styling seam is used it may be functional or merely aesthetic. Where the styling seam is functional, it may be adapted to act as a bending hinge 44 when the door 16 is forced open and separated from the surrounding vehicle panel 12 along the frangible forward 46 and side 48 marginal edges. The bending hinge 44 allows the door 16 to swing outward and upward from the panel 12 during air bag 24 deployment while retaining the door 16 to the panel 12. Alternatively, the styling seam may also be designed as a frangible region of reduced cross section in similar fashion to the forward 46 and side 48 edges.

A first pair of flexible tethers are generally indicated at 50 in FIGS. 2 and 3. Each tether comprises PVC-coated nylon and has an outer end portion 52 fastened to the door inner surface 38 and an inner end portion 54 fastened to the air bag dispenser assembly 20. In other embodiments the first pair of flexible tethers 50 may be fastened to the panel 12 or other adjacent support structures instead of the dispenser 20. The tethers 50 may incorporate any one or more of a number of different tether constructions known in the art. One example of an acceptable tether construction is disclosed in U.S. Pat. No. 5,564,731, is assigned to the assignee of the present invention and is incorporated herein by reference.

The inner end portion 54 of each tether 50 of the first pair of tethers is fastened to the air bag dispenser assembly 20 at a tether control point shown at 56 in FIG. 2 adjacent the reaction plate inner edge 34. The tether inner end portions 54 are fastened by folding them within a U-shaped channel 58 formed along the reaction plate inner edge 34. As shown in FIG. 3, a row of holes 60 is formed along each side of the U-shaped reaction plate channel 58 to receive fasteners 62 that attach the reaction plate 28 to an elongated rectangular air bag dispenser flange 64. The dispenser flange 64 is horizontally disposed and extends integrally upward from the air bag dispenser apparatus 20. The flange 64 includes a row of flange holes 66 corresponding to the holes in the U-shaped reaction plate channel 58. One or more of the fasteners that connect the reaction plate 28 to the dispenser assembly 20 also pass through the portion of each tether inner end 54 that is folded within the U-shaped channel 58.

As is best shown in FIG. 2, the outer end portion 52 of each tether 50 of the first pair of tethers is fastened to the door 16 by eight heat-staked pins 68. The pins 68 extend integrally inward from the air bag 24 deployment door 16 as shown in FIG. 8. The pins 68 are preferably formed with the door 16 and the vehicle panel 12 as a single unitary piece. Other embodiments may use hot staked bosses as disclosed in U.S. Pat. No. 5,564,731, assigned to the assignee of the present invention and incorporated herein by reference. Still other embodiments may use screws 76b engaged with screw bosses as is representatively shown at 67 in FIG. 17. The screw bosses 67 may be integrally formed to extend inward from the door 16. The bosses 67 may be threaded or unthreaded for use with self-tapping screws. Other embodiments may use any number of suitable fastening means known in the art.

The air bag passive supplemental restraint apparatus 10 described above is optimized to open integral doors in instrument panels, comprising hard outer or "first" surfaces, e.g., injection-molded panels. However, the invention may also be used where, as shown in FIG. 2, the hard outer surface is covered with a flexible skin 69 or skin 69 and foam 71 layers. In other words, a flexible skin 69 may be applied to cover at least a portion of the vehicle dash panel 12 and/or air bag deployment door 16 in a layered disposition. A foam layer 71 may also be included between the skin 69 and a portion of the panel 12 and/or the door 16.

The door 16 and panel 12 preferably comprise an injection molded polycarbonate/acrylonitrile butadiene styrene blend (PC/ABS) or polypropylene.

Examples of acceptable PC ABS formulations include GE MC 8002 and Dow Pulse #830. An example of an acceptable polypropylene is Montell #BR33GC. Other suitable materials may include polyesters, polyurethanes, polyphenylene oxide, polystyrenes, polyolefins, or polyolefin elastomers.

According to the second embodiment of the invention shown in FIGS. 4–7, the air bag deployment door 16' is defined by a visible marginal edge 18' and includes eight doghouse-shaped fastener brackets 70. Each fastener bracket 70 extends integrally inward toward the air bag dispenser assembly 20' from the door inner surface 38' in place of the ribs 40 of the first embodiment. Each fastener bracket 70 includes an attachment surface 72 spaced inwardly from and supported generally parallel to the door inner surface 38'. The fastener brackets 70 are preferably integrally formed with the door 16' and the vehicle dash panel 12' as a single unitary piece.

The first tether 50' of the second embodiment makes up a portion of a single continuous tether sheet rather than comprising two separate tethers as in the first embodiment. As shown in FIGS. 4–7, an outer end 52' of the first tether 50' is attached to a forward portion 74 of the door 16' adjacent a forward marginal edge 46' of the door 16' disposed opposite the hinge 44'. More specifically, four rivets 76 attach the outer end 52' of the first tether 50' to the attachment surfaces 72 of four fastener brackets 70 formed on the forward portion 74 of the door 16. The fastener brackets 70 support the rivets 76 without affecting the aesthetic continuity of the outer door surface 22'. In other embodiments, other fastener bracket configurations including heat staking pins and screw bosses and other suitable types of fasteners and fastening methods may be used as is known in the art.

Figure 4:
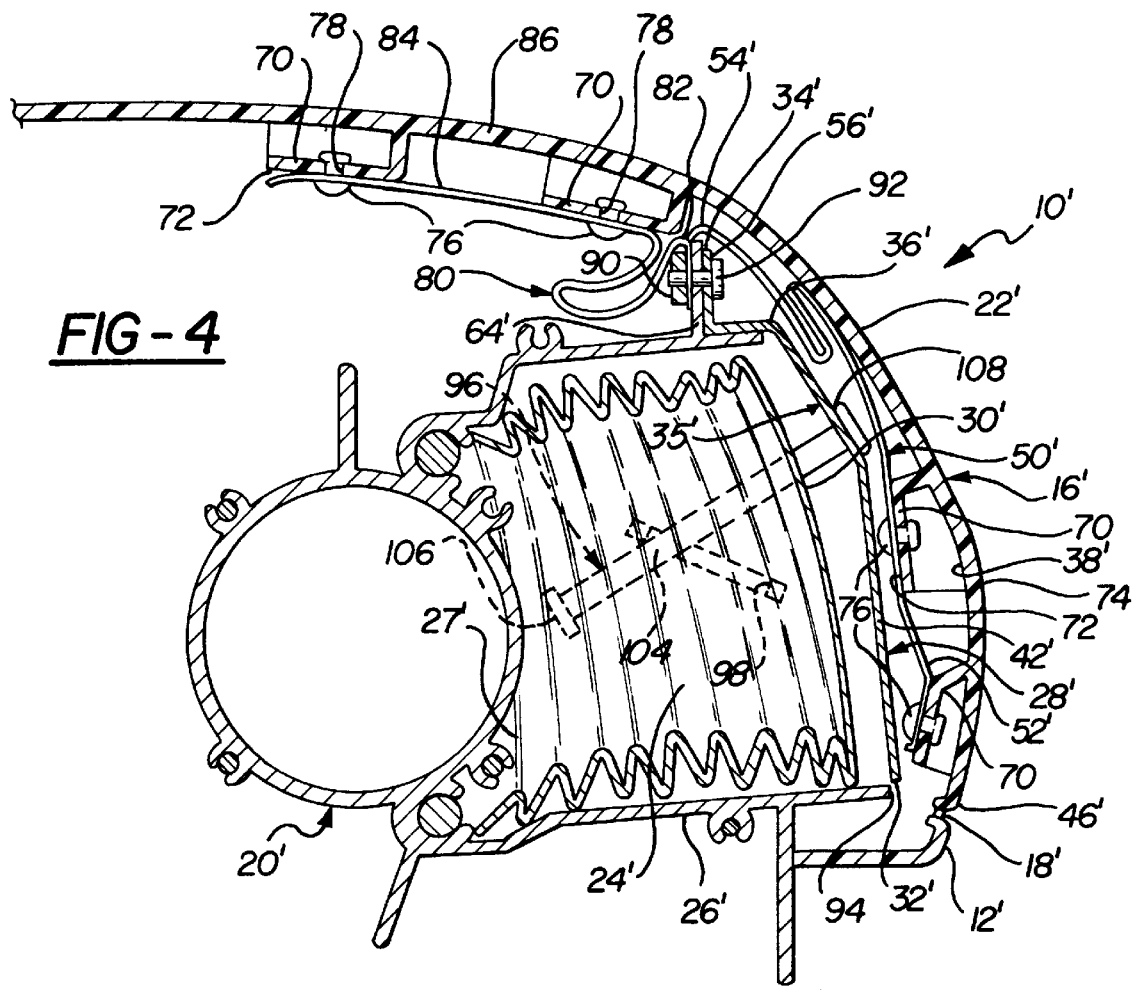
FIG. 4 is a cross-sectional end view of a second passive restraint system constructed according to the present invention.
Figure 5:
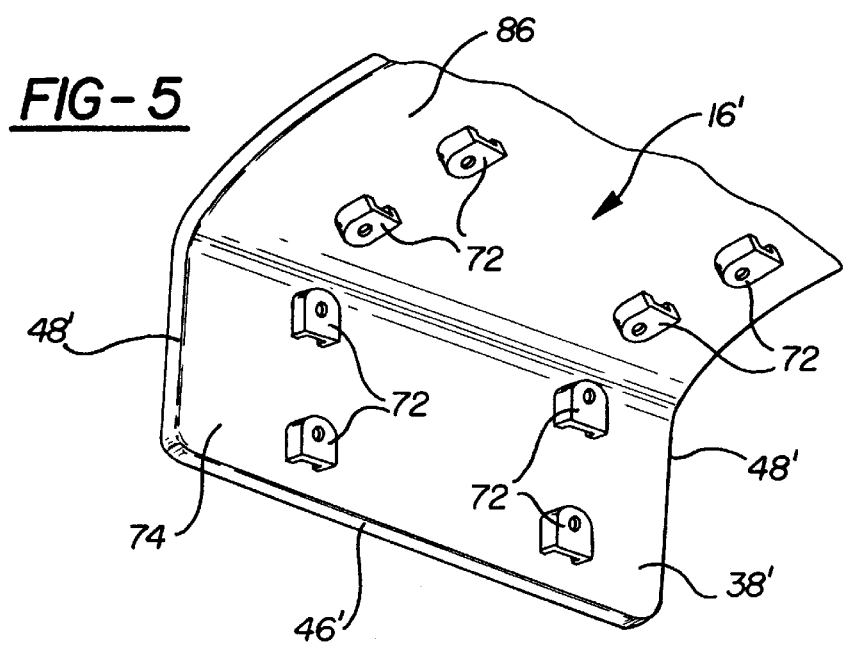
FIG. 5 is a fragmentary perspective view of a PSIR door of the passive restraint system of FIG. 4.
Figure 6:
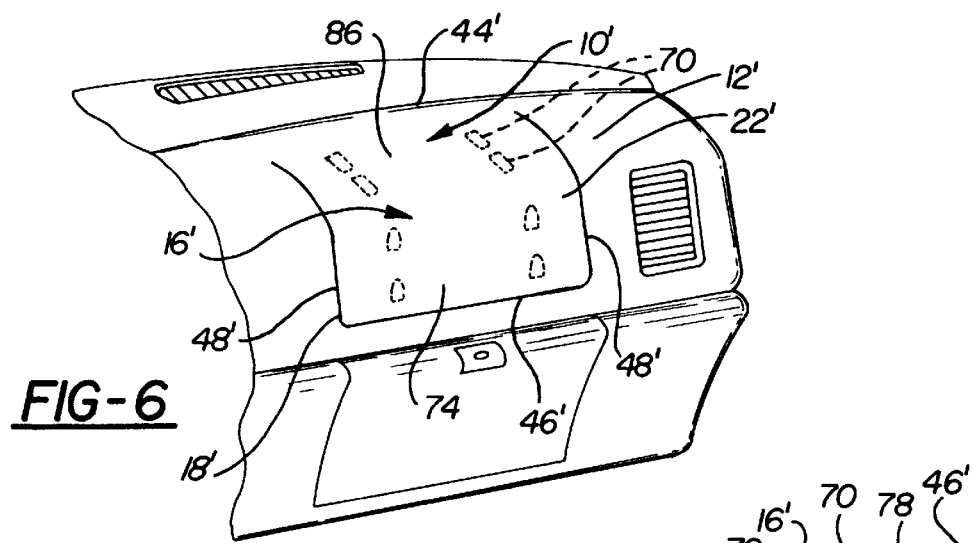
FIG. 6 is a fragmentary perspective view of the PSIR door of FIG. 5 installed in a vehicle dash panel.
Figure 7:
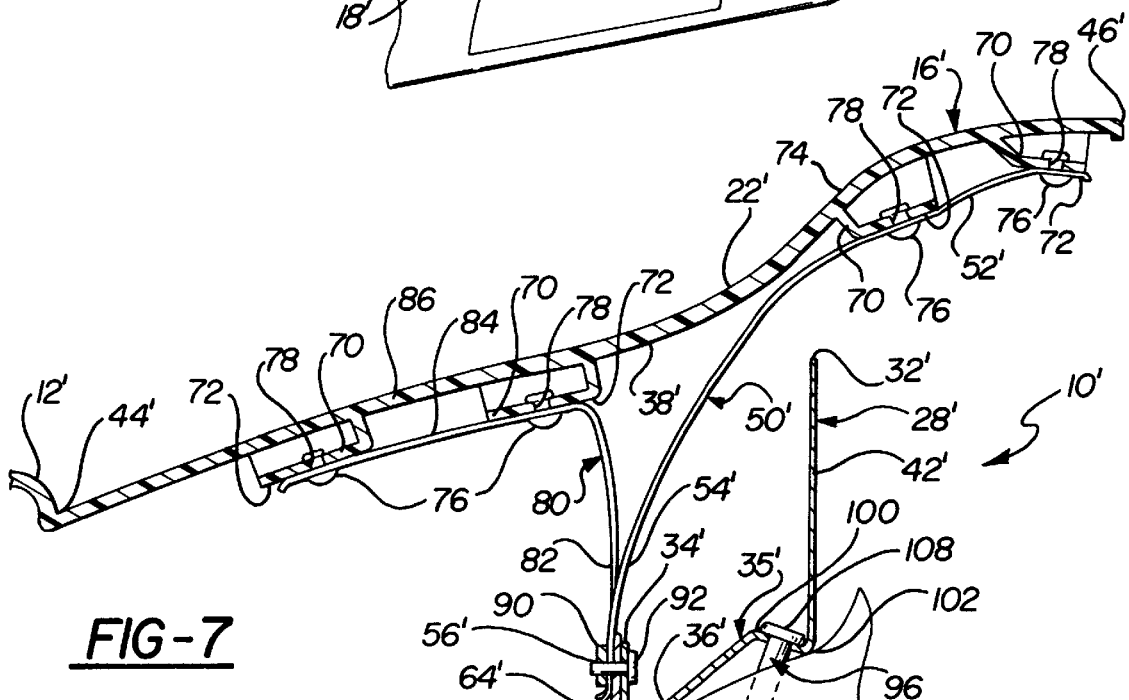
FIG. 7 is a cross-sectional end view of the passive restraint system of FIG. 4 during air bag inflation.

As shown in FIGS. 4 and 7, each fastener bracket 70 includes a fastener aperture 78 disposed through the attachment surface 72 of the bracket 70 to receive one of the rivets 76. Each rivet 76 comprises a shaft portion that extends through the aperture 78 and also through a hole formed in the first tether 50' to hold the first tether 50' to the fastener bracket 70 in conventional fashion.

The four fastener brackets 70 that attach the first tether 50' to the door 16' extend integrally inward from the door inner surface 38' adjacent a lower marginal region of the door 16' to a point adjacent the reaction plate 28'. Similar to the ribs 40 of the first embodiment, the fastener brackets 70 present the reaction plate lower panel 42' in a plane more perpendicular to the direction of air bag 24' deployment from the dispenser 20'. In other words, the fastener brackets 70 span the space between the outwardly curved lower marginal door region and the generally vertical reaction plate lower panel 42'.

The single continuous tether sheet that includes the first flexible tether 50' also includes a second flexible tether, generally indicated at 80 in FIGS. 4 and 7. The second tether 80 has an inner end portion 82 fastened to the air bag dispenser assembly 20' at the tether control point 56'. In other embodiments the second tether 80 may be secured either to the panel 12' or to another adjacent structure. The second flexible tether 80 has an outer end portion, shown at 84 in FIGS. 4 and 7, that is fastened to an aft portion 86 of the door 16' disposed between the forward door portion 74 and the hinge 44'. The second tether 80 ties the aft door portion 86 to the control point 56' to prevent any portion of the door from over-rotating towards the windshield 14 and breaking off at one of several potential bending points including the hinge 44'.

As shown in FIGS. 4 and 7, the respective inner ends 54', 82 of the first 50' and second 80 tethers are riveted to an elongated rectangular flange 64' at the tether control point 56'. The flange 64' extends integrally upward from the air bag receptacle portion 26' of the air bag dispenser assembly 20'. The tether inner ends 54', 82 are sandwiched between the flange 64' and an elongated metal bar 90. Rivets 92 pass through the flange 64', the tethers 50', 80 and the bar 90.

The air bag receptacle 26' includes a mouth 94 disposed adjacent the air bag deployment door 16'. The mouth 94 has a width measured across the mouth in a direction perpendicular to the hinge 44', i.e., in a generally vertical direction. The hinge 44' is spaced from the mouth 94 a distance equal to at least half of the mouth width. The hinge 44' is displaced in this manner to reduce the maximum opening angle at the hinge 44' to reduce material deformation and stress in the hinge during air bag 24 deployment.

A pair of rigid stop members, representatively indicated at 96 in FIG. 7, are operatively connected to the reaction plate 28' and the air bag dispenser 20'. The stop members 96 limit reaction plate 28' opening travel. The stop members 96 may arrest the reaction plate 28' in a position that will prevent the door 16' from returning to its original position after air bag 24' deployment. Each stop member is preferably fabricated from steel but may be made of other suitably rigid materials.

The stop members 96 are slidably supported in slots representatively shown at 98 in FIG. 7 and disposed at opposite lateral sides of the receptacle portion 26' of the air bag dispenser apparatus 20'. Each stop member 96 is fixed to the reaction plate 28' at a stop point representatively shown at 100 in FIG. 7. The stop point 100 is disposed between the first hinge line 36' and a reaction plate outer marginal edge 32' disposed opposite the reaction plate inner edge 34'.

The outer panel portion 42' of the reaction plate 28' is outwardly and upwardly pivotable away from the air bag dispenser 20' by bending the reaction plate 28' along a second horizontal hinge line shown at 102 in FIG. 7. The second hinge line 102 is disposed horizontally across the reaction plate 28' adjacent the stop point 100 and extends generally parallel to the first hinge line 36'. The second hinge line 102 is spaced approximately one-third the distance between the first hinge line 36' and the reaction plate outer marginal edge 32'. This double hinge arrangement allows the reaction plate 28' to bend into an outwardly-rotated and upwardly extended position. In this position the plate 28' prevents the air bag deployment door 16' from rebounding off the tethers 50', 80 and returning to its original position immediately after a deploying air bag 24' has forced the door 16' open.

Each stop member 96 is an elongated steel pin having a cylindrical shaft portion 104 as is representatively shown in FIG. 7. Inner 106 and outer 108 circular disk-shaped stop flanges are disposed at respective inner and outer distal ends of the shaft portion 104 of each stop member 96. The inner stop flange 106 of each stop member 96 extends radially and integrally outward from the shaft portion 104. The outer stop flange 108 of each stop member 96 is preferably fixed to the reaction plate 28' by spot welding or arc welding.

The elongated slots 98 on either side of the air bag receptacle 26' each have a width slightly greater than that of the shaft portion 104 of each stop member 96. The shaft portion 104 of each stop member 96 is slidably disposed within one of the slots 98 to allow the stop members 96 to move between pre-inflation stowed positions, representatively shown in FIG. 4, and post-inflation deployed positions, representatively shown in FIG. 7. The reaction plate 28' pulls the stop members 96 from the stowed position to the deployed position when the reaction plate 28' opens under the force of an inflating air bag 24'. When the stop members 96 reach their deployed positions the inner stop flanges 106 engage the slot 98 and arrest reaction plate 28' movement. The stop members 96 arrest the reaction plate 28' in a position to prevent the door 16' from returning to its original position following air bag deployment.

Figure 9:
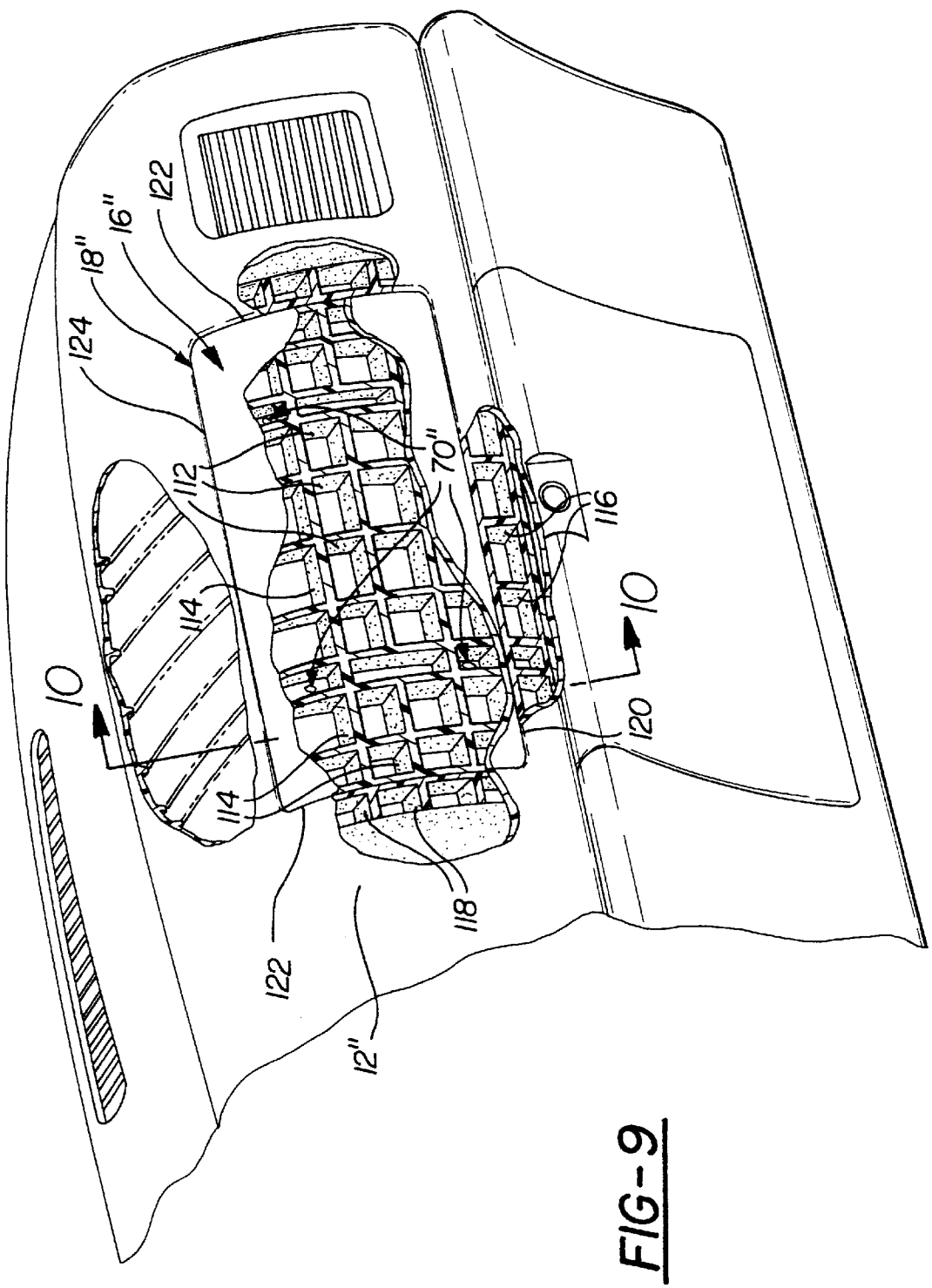
FIG. 9 is a perspective view of a third passive restraint system constructed according to the present invention and installed in a vehicle dash panel.
Figure 10:
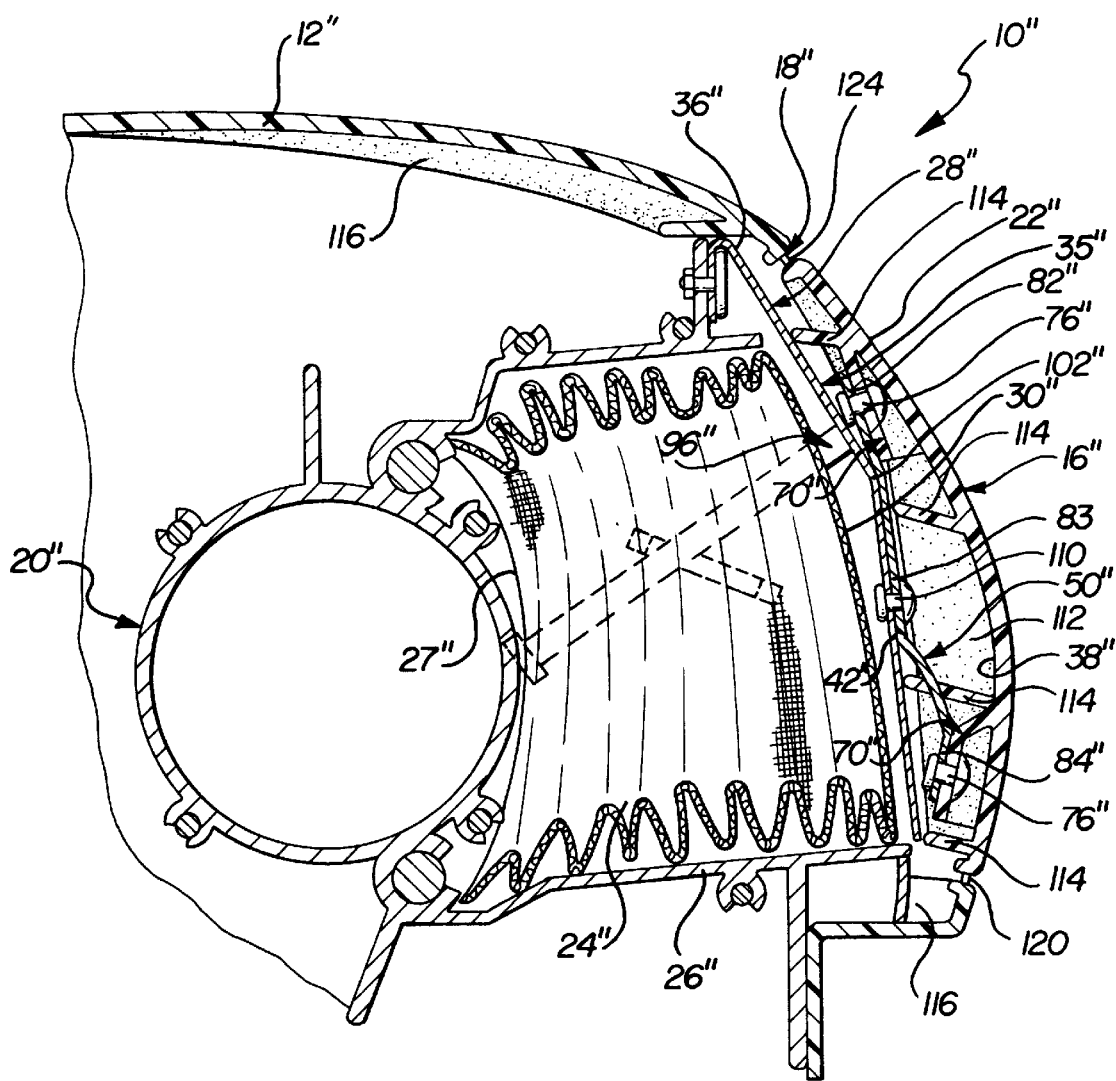
FIG. 10 is a cross-sectional view of the passive restraint system of FIG. 9 taken along line 10—10 of FIG. 9.
Figure 11:
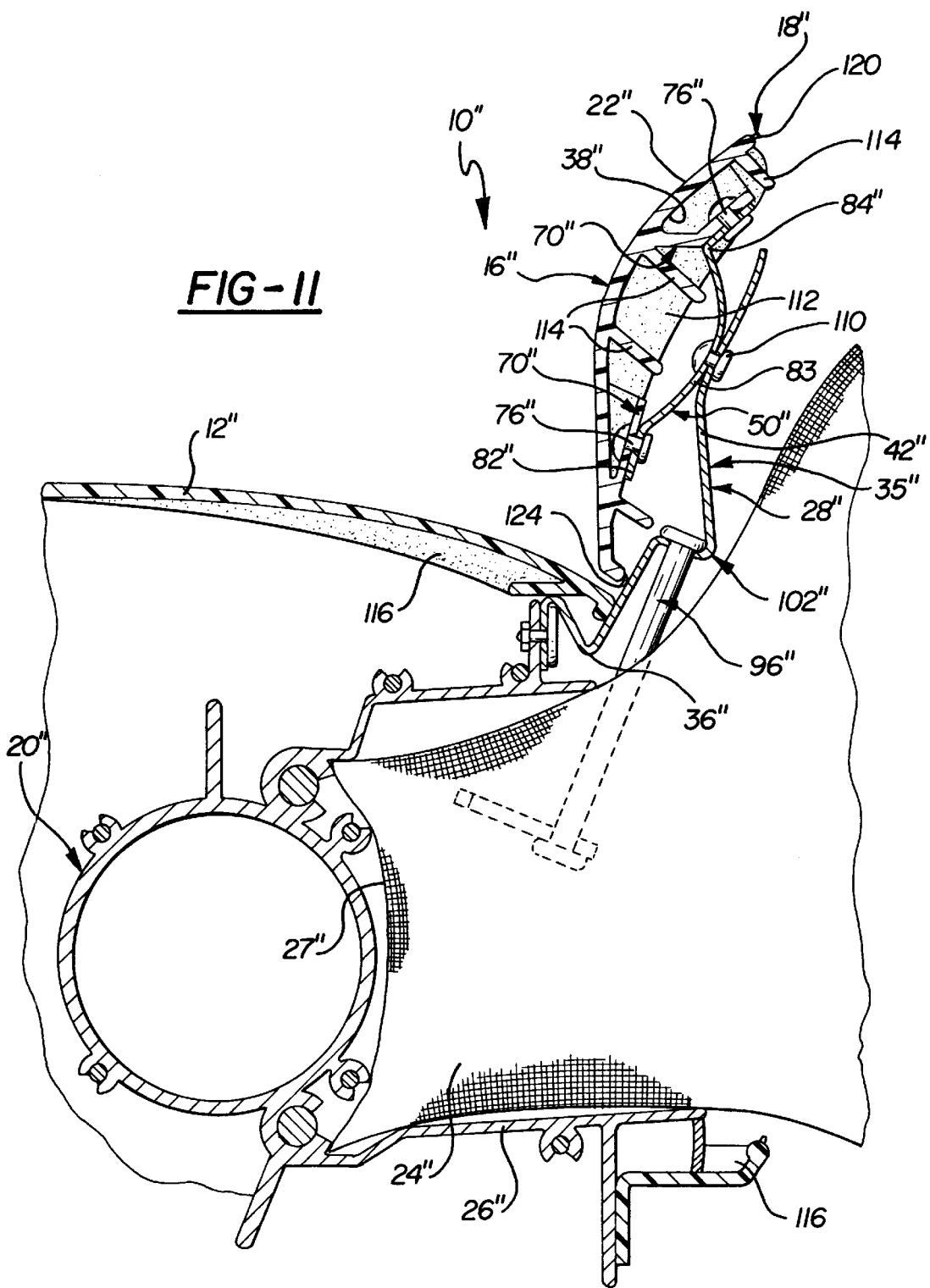
FIG. 11 is a cross-sectional view of the passive restraint system of FIG. 9 taken along line 10—10 of FIG. 9 during air bag inflation.

According to the third embodiment of the invention shown in FIGS. 9–11, the frangible marginal edge 18" defines the entire perimeter of the air bag deployment door 16". In other words, the frangible marginal edge 18" extends completely around the air bag deployment door 16" in an unbroken circuit as is best shown in FIG. 9. A pair of flexible tethers, representatively indicated at 50" in FIGS. 10 and 11, is fastened between the air bag deployment door 16" and the reaction plate 28". Each tether 50" includes an inner end portion 82" fastened to the door 16", an outer end portion 84" fastened to the door 16" and a middle portion 83 fastened to the reaction plate 28" between the second hinge line 102" and the reaction plate outer marginal edge 32". The middle portion 83 of each tether 50" is disposed approximately midway between the inner 82" and outer 84" end portions of each tether 50".

The air bag deployment door 16" includes only four of the fastener brackets 70" disposed in a rectangular pattern as shown in FIG. 9. The inner end portion 82" and outer end portion 84" of each tether 50" are fastened to the attachment surface of one of the four fastener brackets 70" by rivets 76" as shown in FIGS. 10 and 11. As is also shown in FIGS. 10 and 11, the middle portion 83 of each tether 50" is fastened to the reaction plate 28" between the second hinge line 102" and the reaction plate outer marginal edge 32" by a rivet 110.

As shown in FIGS. 9–11, nine vertical door ribs 112 extend integrally inward from the door inner surface 38" to a point adjacent the reaction plate 28". 24 short horizontal door ribs 114 connect adjacent vertical door ribs 112 to form a rectangular grid pattern best shown in FIG. 9. As best shown in FIG. 9, a plurality of vertical 116 and horizontal 118 panel ribs also extend integrally inward from an inner surface of the vehicle panel 12" adjacent the frangible marginal edge 18" of the door perimeter and are spaced apart around the door perimeter. The door ribs 112, 114 and panel ribs 116, 118 stiffen the door 16" and vehicle panel 12" against air bag opening shock and help concentrate opening forces along the frangible marginal edge 18" between the panel 12" and the door 16". The door ribs 112, 114 and panel ribs 116, 118 are integrally formed with the door 16" and the vehicle panel 12" as a single unitary piece by injection molding.

In practice, when the air bag inflates it forces the reaction plate 28" to bend outward and upward around the first 36"

and second 102" horizontal hinge lines. As the reaction plate 28" rotates outward it concentrates the inflation force along a lower edge portion 120 of the frangible door edge 18". This helps to predictably separate the door 16" from the vehicle dash panel 12" by tearing first along a lower edge portion 120 of the marginal edge 18" of the door 16" then allowing the tear to propagate up two side edge portions 122 of the door edge 18". The tear then propagates from the side edge portions 122 inwardly along an upper edge portion 124 of the marginal door edge 18" until the door 16" completely separates from the vehicle dash panel 12". Because the two tethers 50" connect the door 16" directly to the reaction plate 28", they prevent the door 16" from flying free. Similar to the second embodiment, the stop members 96" of the third embodiment limit how far the reaction plate 28" can bend, leaving the reaction plate 28" in a generally vertical position. Unlike the second embodiment, however, the upwardly-bent reaction plate 28" and the tethers 50" of the third embodiment hold the air bag deployment door 16" away from vehicle occupants. Alternatively, tearing may occur along the lower edge portion 120, side edge portions 122 and upper edge portion 124 virtually simultaneously.

In other embodiments, in place of the pin and slot arrangement described for the stop member above, any one of a number of different configurations may be employed to arrest reaction plate 28 travel in a position to prevent an air bag door 16 from returning to its original position.

A fourth embodiment of a passive supplemental restraint apparatus is generally shown at 10s in FIGS. 12–16. Reference numerals with the suffix "s" in FIGS. 12–16 indicate alternative configurations of elements that also appear in the third embodiment. Where portions of the third embodiment description use reference numerals to refer to the figures, we intend those portions to apply equally to elements designated by the suffix "s" in FIGS. 12–16.

Figure 12:
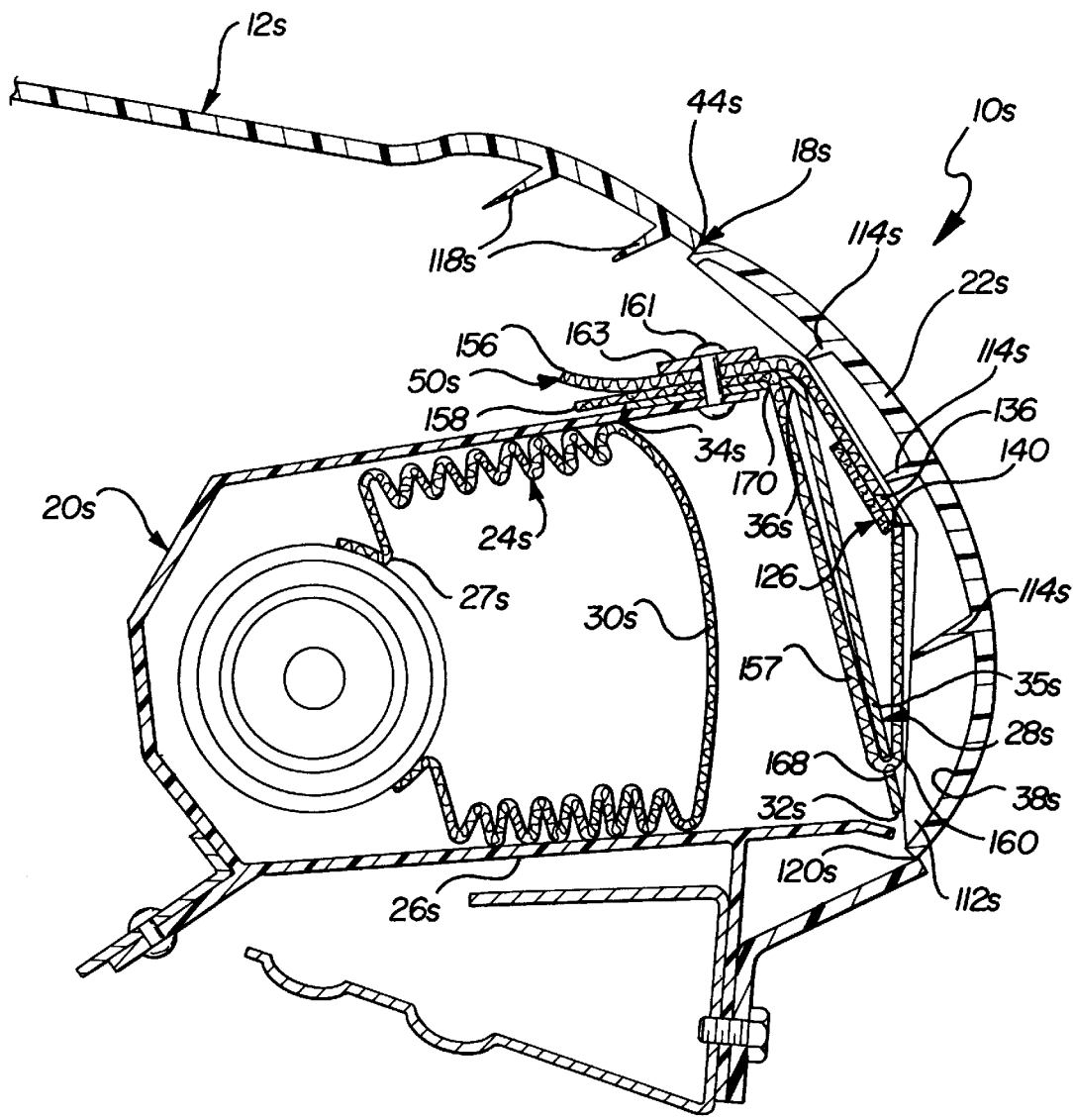
FIG. 12 is a first cross-sectional view of a fourth passive restraint system constructed according to the present invention.
Figure 13:
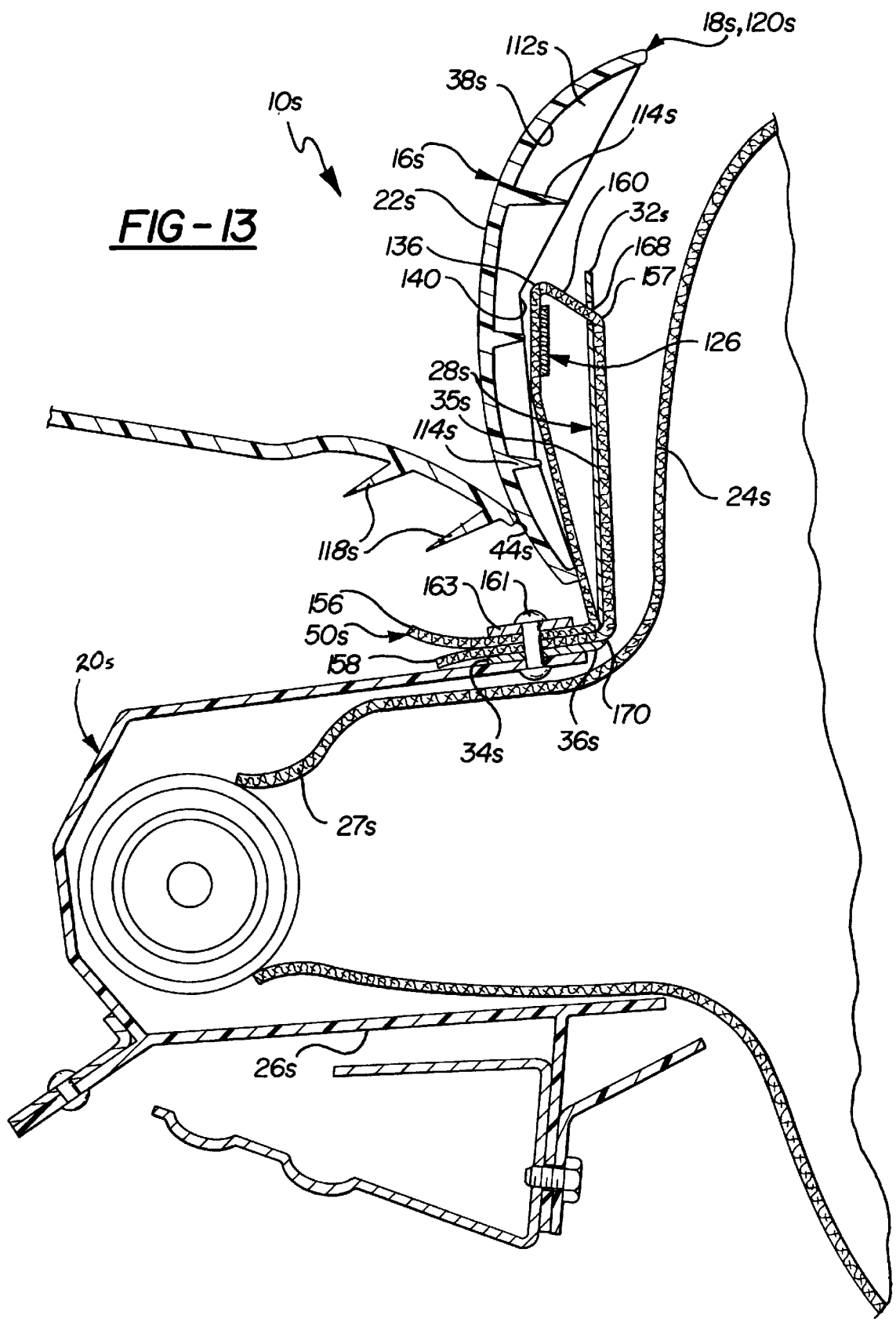
FIG. 13 is a cross-sectional view of the passive restraint system of FIG. 12 during air bag inflation.
Figure 15:
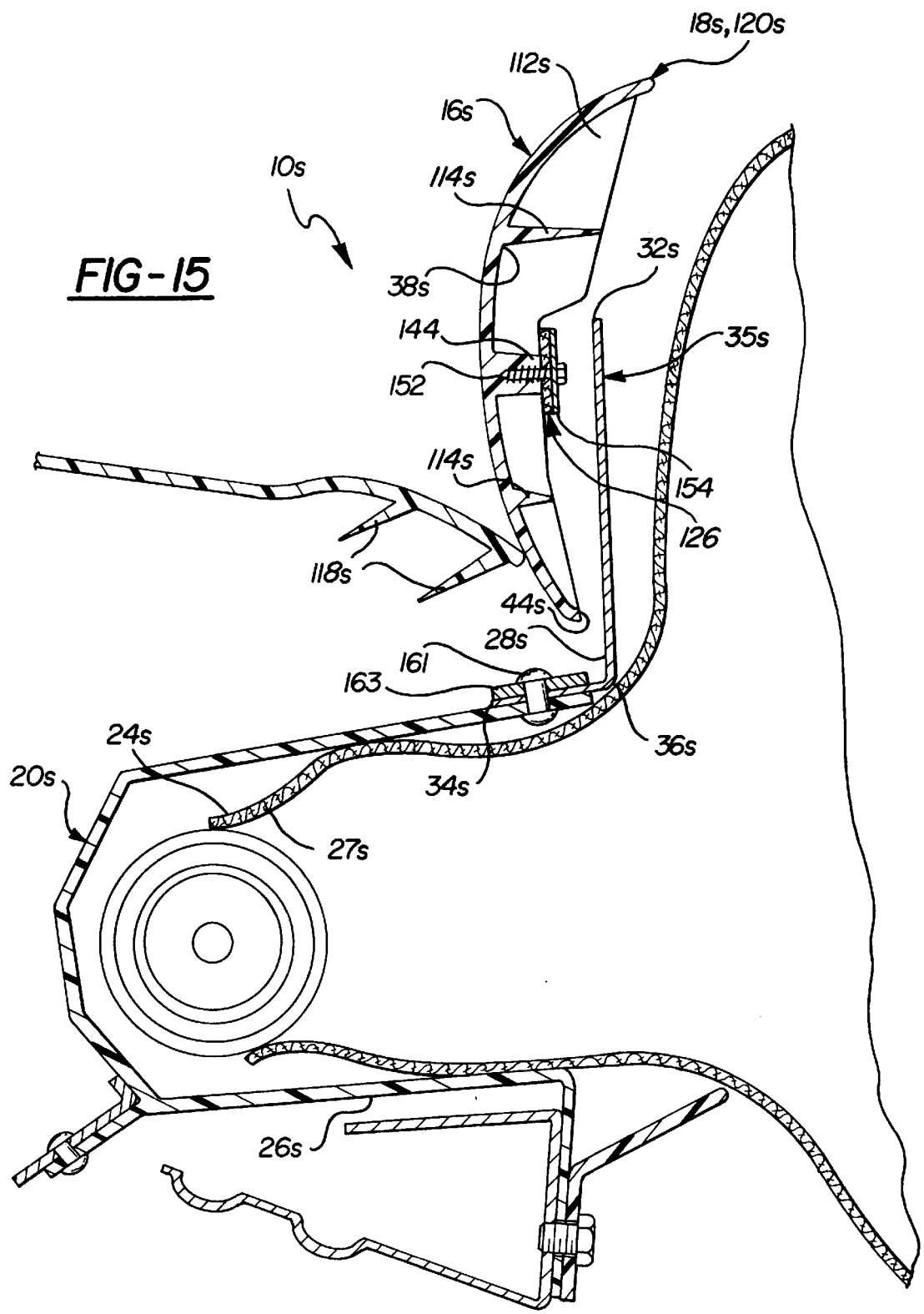
FIG. 15 is a cross-sectional view of the passive restraint system of FIG. 12 taken through a screw boss of the system during air bag inflation.
Figure 16:
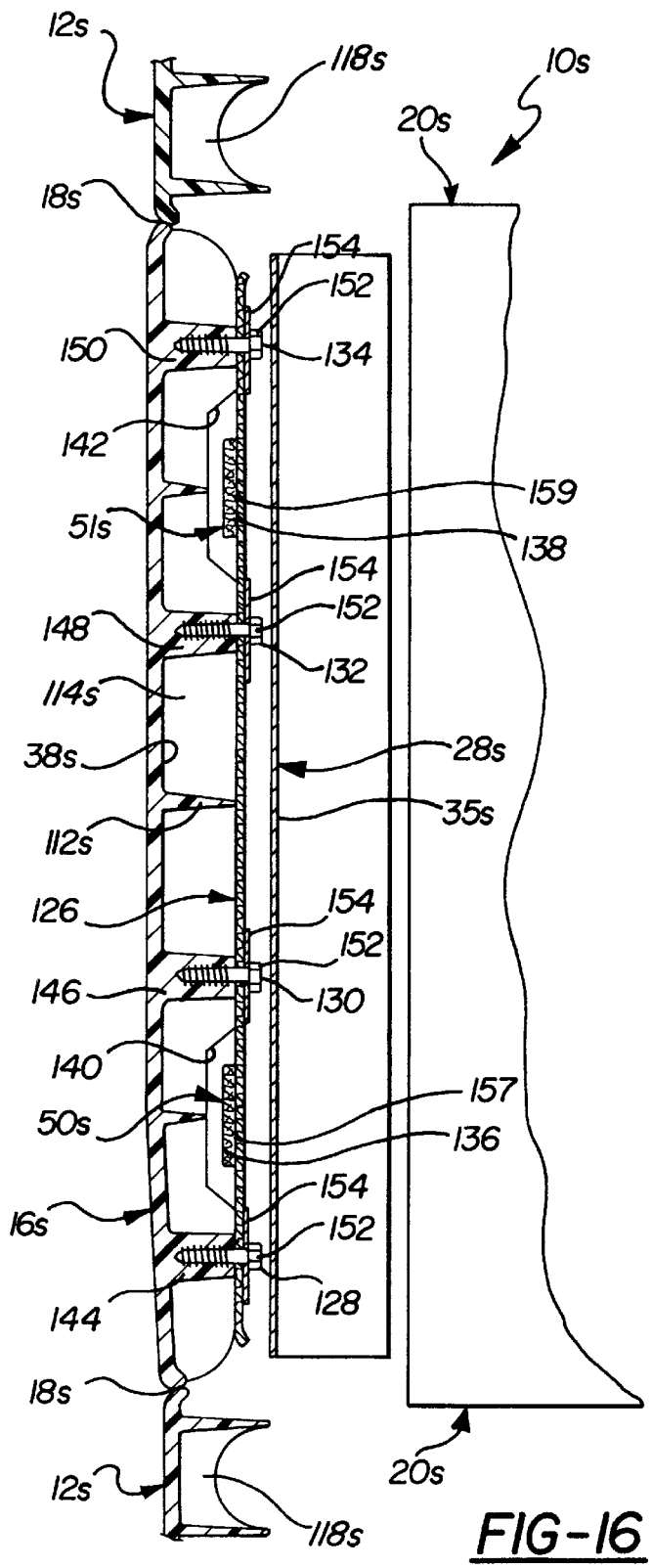
FIG. 16 is a cross-sectional view of the passive restraint system of FIG. 12 taken along line 16—16 of FIG. 14.

The passive supplemental restraint apparatus generally indicated at 10s includes first and second vertically-disposed elongated flexible nylon tethers, generally indicated at 50s, 51s in FIG. 16, and representatively indicated at 50s in FIGS. 12 and 13. The tethers 50s, 51s slidably engage the door 16s rather than being fixed to the door 16s as disclosed in the description of the third embodiment. The apparatus 10s includes a flat, elongated flexible nylon fabric strap, generally indicated at 126 in FIGS. 12–16. The strap 126 has a length extending between two strap ends and is horizontally disposed flat against the door 16s. As is best shown in FIG. 16, the strap 126 is fastened to the door 16s at first, second, third and fourth spaced attachment points 128, 130, 132, 134.

Each flexible tether 50s, 51s includes a tether loop, representatively shown at 157 in FIGS. 12 and 13 and at 157 and 159, respectively, in FIG. 16. The loop portion 157 of each tether 50s, 51s extends from at least one common tether loop attachment portion. In the present embodiment, the tether loop attachment portions each comprise first and second tether loop ends, representatively shown at 156, 158 in FIGS. 12 and 13. Fasteners 161 extend through a strap retention member 163, both tether loop ends 156, 158, the reaction plate 28s and the air bag dispenser 20s. The fasteners 161 fasten the tether loop ends 156, 158 together, and fasten the loop ends 156 and reaction plate 28s to the air bag dispenser 20s adjacent the reaction plate inner edge 34s. In other embodiments the first tether loop end 156 of each tether 50s, 51s may be attached at a different location than the second tether loop end 158 of each tether 50s, 51s.

A middle portion 136 of the first flexible tether 50s slidably extends between the door 16s and the strap 126, perpendicular to the length of the strap 126, and passes between the first and second attachment points 128, 130. Likewise, a middle portion 138 of the second flexible tether 5is slidably extends between the door 16s and the strap 126, perpendicular to the length of the strap 126, and passes between the third and fourth attachment points 132, 134. In other words, the strap 126 holds the flexible tethers 50s, 51s against the door 16s while allowing the flexible tethers 50s, 51s to slide longitudinally through a pair of slots 140, 142. The slots 140, 142 are formed between the strap 126, the door 16s and the attachment points 128–134 as best shown in FIGS. 12, 13 and 16.

Figure 14:
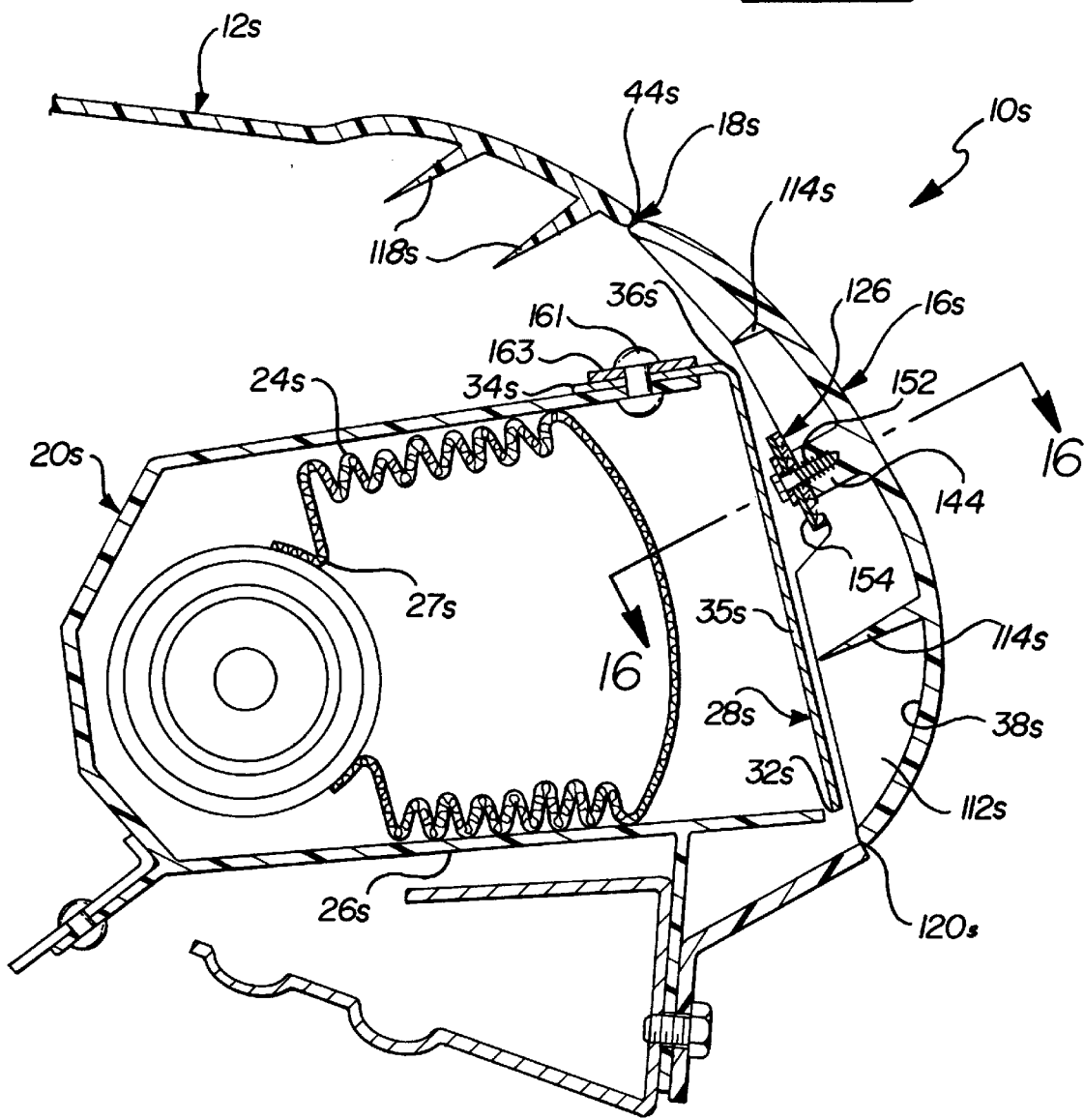
FIG. 14 is a cross-sectional view of the passive restraint system of FIG. 12 taken through a screw boss of the system.

The apparatus (10s) includes first, second, third and fourth screw bosses, shown at 144, 146, 148 and 150 in FIG. 16 and representatively shown at 144 in FIGS. 14 and 15. The bosses 144–150 extend integrally inward from a door inner surface 38s to the respective first, second, third and fourth attachment points 128–134. The screw bosses 144–150 are integrally formed with the door 16s as a unitary piece and are aligned horizontally along the door inner surface 38s. As shown in FIGS. 14–16, screw-type fasteners 152 extend through respective annular washers 154 and attach the strap 126 to the respective first, second, third and fourth bosses 144–150 by threadedly engaging the bosses 144–150.

As with the first and second embodiment, a generally rectangular reaction plate 28s is attached to an air bag dispenser assembly 20s along a reaction plate inner edge 34s, as shown in FIGS. 12–15. An outer portion 35s of the reaction plate 28s is outwardly pivotable away from the air bag dispenser assembly 20s by bending the reaction plate 28s along a hinge line 36s extending parallel to the reaction plate inner edge 34s. Prior to air bag inflation, the reaction plate 28s is bent at the hinge line 36s approximately 85° downward from horizontal. Following air bag inflation, the reaction plate 28s is bent approximately 85° upward from horizontal.

Each flexible tether 50s, 51s has a length extending between first and second tether ends, representatively shown at 156 and 158, respectively, in FIGS. 12 and 13. The first and second tether ends 156, 158 of each flexible tether 50s, 51s are fastened to the air bag dispenser assembly 20s adjacent the reaction plate inner edge 34s forming tether loops as shown in FIGS. 12 and 13. Portion 160 of the first flexible tether 50s slidably engages the outer portion 35s of the reaction plate 28s. Likewise, a corresponding portion of the second flexible tether 51s slidably engages the outer portion 35s of the reaction plate 28s at a point spaced laterally from the point where the first flexible tether 50s engages the outer portion 35s of the reaction plate 28s.

As shown in FIGS. 12 and 13, the first flexible tether 50s slidably extends through a first opening or slot 168 in the outer portion 35s of the reaction plate 28s adjacent a reaction plate outer marginal edge 32s. Likewise, the second flexible tether 51s slidably extends through a second slot, spaced laterally from the first slot along the reaction plate outer marginal edge 32s.

According to the fourth embodiment, when the air bag inflates, it forces the outer portion 35s of the reaction plate 28s to bend outward and upward around the horizontal hinge line 36s. The outer portion 35s of the reaction plate 28s will then continue pivoting into a position angularly spaced from the air bag deployment path and more than 45 degrees from its position before air bag deployment. The angularly spaced position of the outer portion 35s of reaction plate is best shown in FIGS. 13 and 15. As the reaction plate 28s rotates outward it concentrates the inflation force along a lower edge portion 120s of the frangible door edge 18s. This begins tearing that advances around the entire door edge 18s and separates the door 16s from the vehicle dash panel 12s. Similar to the third embodiment, the first and second tethers 50s, 51s of the fourth embodiment connect the door 16s to the reaction plate 28s to decelerate and prevent the door 16s from flying free.

Unlike the third embodiment, however, the tethers 50s, 51s of the fourth embodiment allow the door 16s to slide along a portion of their lengths. The sliding prevents the loads exerted by door 16s on the tethers 50s, 51s from concentrating at any one attachment point along the tethers 50s, 51s. The sliding also spreads the door arresting shock over time, reducing the probability of the door 16s fracturing or pulling loose from the tethers 50s, 51s.

Although air bag inflation eventually causes the door to tear free along an upper edge portion 44s of the door perimeter 18s, the upper edge portion 44s initially acts as a living hinge. The door 16s initially swings outward and upward about the upper edge portion 44s while remaining in direct contact with the reaction plate 28s.

During this initial opening swing, the plate 28s and the door 16s rotate around different axes because the upper edge portion 44s is offset from the reaction plate hinge line 36s. Because the upper edge 44s and hinge line 36s are offset, and because the tethers 50s, 51s are slidably engaged with the plate 28s and the door 16s, the tethers 50s, 51s are able to hold the plate 28s and door 16s in close proximity to one another without arresting or overly restricting their movement.

The tethers 50s, 51s offer little resistance from the time the door 16s is initially forced open until the door 16s and reaction plate 28s reach an approximately horizontal position. However, when the reaction plate 28s reaches this horizontal position, the door 16s tears loose from the upper edge 44s and is arrested by the tethers 50s, 51s. As the reaction plate 28s moves through the horizontal and continues to swing upward toward its fully open near-vertical position, the reaction plate 28s rapidly decelerates. As the reaction plate 28s decelerates, the tethers 50s, 51s allow the door 16s to swing upwards, absorbing energy as the tethers 50s, 51s slide through the slots 168, 170 in the reaction plate and through the gap between the horizontal strap 126 and the door 16s.

Preferably the tethers 50s, 51s and horizontal strap 126 are both made of nylon fabric. However, any one of a number of other suitable materials may be used to construct the tethers 50s, 51s and/or the strap 126, to include thin metal straps. In addition, a slotted insert may be used, in place of a strap, to slidably retain the tethers 50s, 51s. In other words, the tethers 50s, 51s; strap 126; reaction plate 28s; door 16s; and offset pivot points 36s, 44s make up a compound-swing tether system that eliminates lash and absorbs door opening forces.

Other possible variations on the fourth embodiment include the strap 126 being made of some flexible material other than fabric. Moreover, the strap 126 need not be flat, but may be of any cross-sectional shape, e.g., a cord-like structure having a circular cross-section. The reaction plate 28s and/or tether ends 156, 158 could be attached to the vehicle panel 12s rather than the air bag dispenser 20s along the reaction plate inner edge 34s. In addition, in other embodiments the tethers 50s, 51s need not slidably engage the reaction plate 28s. Instead, the tethers 50s, 51s may be fixed to the reaction plate 28s at some point along their respective lengths.

The description and drawings illustratively set forth our presently preferred invention embodiments. We intend the description and drawings to describe these embodiments and not to limit the scope of the invention. Obviously, it is possible to modify these embodiments while remaining within the scope of the following claims. Therefore, within the scope of the claims, one may practice the invention otherwise than as the description and drawings specifically show and describe.

I claim:

1. A passive supplemental restraint apparatus for an automotive vehicle, the apparatus comprising:
   an interior vehicle panel;
   an air bag deployment door integrally formed in the vehicle panel, the air bag deployment door having a perimeter, at least a portion of the perimeter defined by a frangible marginal edge;
   an air bag dispenser supported adjacent a door inner surface opposite a door outer surface;
   an air bag supported in an air bag receptacle of the air bag dispenser, the air bag having an inner end operatively connected to the air bag dispenser and an outer end disposed adjacent the air bag deployment door, the air bag dispenser configured to direct air bag deployment along a deployment path through the vehicle panel; the apparatus characterized by:
   a reaction plate disposed between the air bag and the air bag deployment door and configured to receive the force of air bag deployment from the dispenser and to direct and distribute that force against the door inner surface to separate the door from the vehicle panel along the frangible marginal edge of the door, the reaction plate being configured to bend under the force of air bag inflation causing a pivotable panel portion of the reaction plate to pivot into a position angularly spaced from the air bag deployment path to prevent the door from rebounding into the air bag, the pivotable panel portion of the reaction plate being separate from the door to allow the door and pivotable panel portion to move independently of each other following door separation.

2. A passive supplemental restraint apparatus as defined in claim 1 in which the door and vehicle panel comprise a single unitary piece.

3. A passive supplemental restraint apparatus as defined in claim 1 in which the reaction plate includes a marginal outer edge portion having a shape generally identical to and aligned with at least a portion of the frangible marginal edge of the air bag deployment door.

4. A passive supplemental restraint apparatus as defined in claim 1 in which the reaction plate is attached to the air bag dispenser along a reaction plate inner edge and in which an outer portion of the reaction plate is outwardly pivotable away from the air bag dispenser by bending the reaction plate along a first hinge line extending parallel to the attached reaction plate inner edge.

5. A passive supplemental restraint apparatus as defined in claim 4 further including a first flexible tether having an outer end portion fastened to the door and an inner end portion fastened to the air bag dispenser at a point adjacent the reaction plate inner edge.

6. A passive supplemental restraint apparatus as defined in claim 4 further including a stop member operatively connected between the reaction plate and the air bag dispenser.

7. A passive supplemental restraint apparatus as defined in claim 1 in which at least a portion of the reaction plate is disposed adjacent the door inner surface.

8. A passive supplemental restraint apparatus as defined in claim 1 in which the frangible marginal edge of the door comprises a region of reduced cross section.

9. A passive supplemental restraint apparatus as defined in claim 1 in which the air bag deployment door includes a rear marginal edge that forms a hinge between the vehicle panel and the door.

10. A passive supplemental restraint apparatus as defined in claim 1 in which a flexible skin covers at least a portion of the vehicle panel in a layered disposition.

11. A passive supplemental restraint apparatus as defined in claim 1 in which a foam layer covers at least a portion of the vehicle panel.

12. A passive supplemental restraint apparatus as defined in claim 1 in which the frangible marginal edge defines the entire air bag deployment door perimeter.

13. A passive supplemental restraint apparatus as defined in claim 12 in which a plurality of ribs extend integrally inward from an inner surface of the vehicle panel adjacent the frangible marginal edge of the door perimeter and are spaced apart around the door perimeter.

14. A passive supplemental restraint apparatus as defined in claim 12 in which the frangible marginal edge of the door comprises a region of reduced cross section.

15. A passive supplemental restraint apparatus as defined in claim 12 in which the reaction plate includes a marginal edge portion having a shape generally identical to and aligned with at least a portion of the frangible marginal edge of the air bag deployment door.

16. A passive supplemental restraint apparatus as defined in claim 12 in which the reaction plate is rigidly attached to the air bag dispenser along a reaction plate inner edge and in which an outer portion of the reaction plate is outwardly pivotable away from the air bag dispenser by bending the reaction plate along a first hinge line extending parallel to the rigidly attached reaction plate inner edge.

17. A passive supplemental restraint apparatus as defined in claim 1 further including a first flexible tether connected to the door and fastened to at least one of the air bag dispenser and the vehicle panel, the reaction plate being configured to bend and rotate the rotatable panel portion of the reaction plate more than 45 degrees into a position blocking the door from rebounding off the tether into the air bag.

18. A passive supplemental restraint apparatus for an automotive vehicle, the apparatus comprising:
   an interior vehicle panel;
   an air bag deployment door integrally formed in the vehicle panel, the air bag deployment door having a perimeter, at least a portion of the perimeter defined by a frangible marginal edge;
   an air bag dispenser supported adjacent a door inner surface opposite a door outer surface;
   an air bag supported in an air bag receptacle of the air bag dispenser, the air bag having an inner end operatively connected to the air bag dispenser and an outer end disposed adjacent the air bag deployment door; a reaction plate disposed between the air bag and the air bag deployment door to receive the force of air bag deployment from the dispenser and to direct and distribute that force against the door inner surface to separate the door from the vehicle panel along the frangible marginal edge of the door, at least a portion of the reaction plate disposed adjacent the door inner surface; at least one rib extending integrally inward from the door inner surface toward the reaction plate.

19. A passive supplemental restraint apparatus for an automotive vehicle, the apparatus comprising:
   an interior vehicle panel;
   an air bag deployment door integrally formed in the vehicle panel, the air bag deployment door having a perimeter, at least a portion of the perimeter defined by a frangible marginal edge;
   an air bag dispenser supported adjacent a door inner surface opposite a door outer surface;
   an air bag supported in an air bag receptacle of the air bag dispenser, the air bag having an inner end operatively connected to the air bag dispenser and an outer end disposed adjacent the air bag deployment door;
   a reaction plate disposed between the air bag and the air bag deployment door to receive the force of air bag deployment from the dispenser and to direct and distribute that force against the door inner surface to separate the door from the vehicle panel along the frangible marginal edge of the door; and
   a first flexible tether connected to the door and fastened to at least one of the air bag dispenser and the vehicle panel, the first flexible tether slidably engaging the door.

20. A passive supplemental restraint apparatus as defined in claim 19 in which a strap is fastened to the door at first and second spaced attachment points, a portion of the first flexible tether slidably extending between the door and the strap and between the first and second attachment points.

21. A passive supplemental restraint apparatus as defined in claim 13 in which:
   first and second bosses extend inward from the door inner surface to the respective first and second attachment points; and
   first and second fasteners attach the strap to the respective first and second bosses.

22. A passive supplemental restraint apparatus as defined in claim 20 in which the first flexible tether engages the reaction plate.

23. A passive supplemental restraint apparatus as defined in claim 22 in which:
   the reaction plate is attached to the air bag dispenser along a reaction plate inner edge;
   an outer portion of the reaction plate is outwardly pivotable away from the air bag dispenser by bending the reaction plate along a hinge line extending parallel to the reaction plate inner edge;
   the first flexible tether includes a tether loop extending from at least one tether loop attachment portion, the tether loop attachment portion fastened to at least one of the air bag dispenser, the vehicle panel and the reaction plate adjacent the reaction plate hinge line;
   a middle tether portion of the first flexible tether is disposed between first and second tether loop ends and slidably engages the outer portion of the reaction plate; and
   an outer portion of the first flexible tether disposed between the middle tether portion and the first tether loop end slidably extends between the door and the strap.

24. A passive supplemental restraint apparatus as defined in claim 23 in which an upper edge portion of the frangible marginal edge of the door extends generally parallel to and is spaced from the reaction plate hinge line.

25. A passive supplemental restraint apparatus as defined in claim 23 in which the first flexible tether slidably extends through an opening in the outer portion of the reaction plate adjacent a reaction plate outer marginal edge.

26. A passive supplemental restraint apparatus as defined in claim 19 in which at least one additional flexible tether slidably engages the door.

27. A passive supplemental restraint apparatus as defined in claim 19 in which the reaction plate is attached to the air bag dispenser along a reaction plate inner edge and the first tether has an inner end portion fastened to the air bag dispenser at a point adjacent the reaction plate inner edge.

28. A passive supplemental restraint apparatus for an automotive vehicle, the apparatus comprising:

an interior vehicle panel;

an air bag deployment door integrally formed in the vehicle panel, the air bag deployment door having a perimeter, at least a portion of the perimeter defined by a frangible marginal edge;

an air bag dispenser supported adjacent a door inner surface opposite a door outer surface;

an air bag supported in an air bag receptacle of the air bag dispenser, the air bag having an inner end operatively connected to the air bag dispenser and an outer end disposed adjacent the air bag deployment door;

a reaction plate disposed between the air bag and the air bag deployment door; and a first flexible tether connected to the door and fastened to at least one of the air bag dispenser and the vehicle panel, the first tether having an outer end portion fastened to the door inner surface by at least one heat-staked pin, the pin extending integrally inward from the air bag deployment door.

29. A passive supplemental restraint apparatus for an automotive vehicle, the apparatus comprising:

an interior vehicle panel;

an air bag deployment door integrally formed in the vehicle panel, the air bag deployment door having a perimeter, at least a portion of the perimeter defined by a frangible marginal edge;

an air bag dispenser supported adjacent a door inner surface opposite a door outer surface;

an air bag supported in an air bag receptacle of the air bag dispenser, the air bag having an inner end operatively connected to the air bag dispenser and an outer end disposed adjacent the air bag deployment door;

a reaction plate disposed between the air bag and the air bag deployment door; and a first flexible tether connected to the door and fastened to at least one of the air bag dispenser and the vehicle panel, the tether being fastened to the door inner surface by a screw threaded into a boss, the boss extending integrally inward from the air bag deployment door.

30. A passive supplemental restraint apparatus for an automotive vehicle, the apparatus comprising:

an interior vehicle panel;

an air bag deployment door integrally formed in the vehicle panel, the air bag deployment door having a perimeter, at least a portion of the perimeter defined by a frangible marginal edge;

an air bag dispenser supported adjacent a door inner surface opposite a door outer surface;

an air bag supported in an air bag receptacle of the air bag dispenser, the air bag having an inner end operatively connected to the air bag dispenser and an outer end disposed adjacent the air bag deployment door;

a reaction plate disposed between the air bag and the air bag deployment door; and a first flexible tether connected to the door and fastened to at least one of the air bag dispenser and the vehicle panel, the door including at least one fastener bracket extending integrally inward toward the air bag dispenser from the door inner surface, the fastener bracket including an attachment surface spaced inwardly from the door inner surface, the first tether attached to the attachment surface by a fastener.

31. A passive supplemental restraint apparatus a defined in claim 30 in which the fastener bracket includes a fastener aperture disposed through the attachment surface of the bracket and in which the fastener comprises a rivet having a shaft portion extending through the aperture.

32. A passive supplemental restraint apparatus as defined in claim 30 in which at least one fastener bracket extends integrally inward from the door inner surface adjacent a lower marginal region of the door to a point adjacent the reaction plate.

33. A passive supplemental restraint apparatus for an automotive vehicle, the apparatus comprising:

an interior vehicle panel;

an air bag deployment door integrally formed in the vehicle panel, the air bag deployment door having a perimeter, at least a portion of the perimeter defined by a frangible marginal edge;

an air bag dispenser supported adjacent a door inner surface opposite a door outer surface;

an air bag supported in an air bag receptacle of the air bag dispenser, the air bag having an inner end operatively connected to the air bag dispenser and an outer end disposed adjacent the air bag deployment door;

a reaction plate disposed between the air bag and the air bag deployment door;

a first flexible tether connected to the door and fastened to at least one of the air bag dispenser and the vehicle panel; and a second flexible tether having an inner end portion fastened to at least one of the air bag dispenser and the vehicle panel, the first tether having an outer end portion fastened to a forward portion of the door adjacent a forward marginal edge of the door, the second flexible tether having an outer end portion fastened to an aft portion of the door.

34. A passive supplemental restraint apparatus as defined in claim 33 in which a single sheet of flexible material comprises both the first and second tethers.

35. A passive supplemental restraint apparatus for an automotive vehicle, the apparatus comprising:

an interior vehicle panel;

an air bag deployment door integrally formed in the vehicle panel, the air bag deployment door having a perimeter, at least a portion of the perimeter defined by a frangible marginal edge;

an air bag dispenser supported adjacent a door inner surface opposite a door outer surface;

an air bag supported in an air bag receptacle of the air bag dispenser, the air bag having an inner end operatively connected to the air bag dispenser and an outer end disposed adjacent the air bag deployment door;

a reaction plate disposed between the air bag and the air bag deployment door, the air bag deployment door including a rear marginal edge that forms a hinge between the vehicle panel and the door, the air bag receptacle including a mouth disposed adjacent the air bag deployment door, the mouth having a width measured across the mouth in a direction perpendicular to the hinge, the hinge spaced from the mouth a distance equal to at least half of the mouth width.

36. A passive supplemental restraint apparatus for an automotive vehicle, the apparatus comprising:

an interior vehicle panel;

an air bag deployment door integrally formed in the vehicle panel, the air bag deployment door having a perimeter, at least a portion of the perimeter defined by a frangible marginal edge;

an air bag dispenser supported adjacent a door inner surface opposite a door outer surface;

an air bag supported in an air bag receptacle of the air bag dispenser, the air bag having an inner end operatively connected to the air bag dispenser and an outer end disposed adjacent the air bag deployment door;

a reaction plate disposed between the air bag and the air bag deployment door, the reaction plate being attached to the air bag dispenser along a reaction plate inner edge and an outer portion of the reaction plate being outwardly pivotable away from the air bag dispenser by bending the reaction plate along a first hinge line extending parallel to the attached reaction plate inner edge;

a stop member operatively connected between the reaction plate and at least one of the air bag dispenser and the vehicle panel, the stop member being connected to the reaction plate at a stop point disposed between the first hinge line and a reaction plate outer marginal edge opposite the reaction plate inner edge; and the outer portion of the reaction plate is outwardly pivotable away from the air bag dispenser by bending the reaction plate along a second hinge line extending adjacent the stop point and generally parallel to the first hinge line, the second hinge line spaced between the first hinge line and the reaction plate outer marginal edge.

37. A passive supplemental restraint apparatus for an automotive vehicle, the apparatus comprising:

an interior vehicle panel;

an air bag deployment door integrally formed in the vehicle panel, the air bag deployment door having a perimeter, at least a portion of the perimeter defined by a frangible marginal edge;

an air bag dispenser supported adjacent a door inner surface opposite a door outer surface;

an air bag supported in an air bag receptacle of the air bag dispenser, the air bag having an inner end operatively connected to the air bag dispenser and an outer end disposed adjacent the air bag deployment door;

a reaction plate disposed between the air bag and the air bag deployment door, the reaction plate being attached to the air bag dispenser along a reaction plate inner edge and an outer portion of the reaction plate being outwardly pivotable away from the air bag dispenser by bending the reaction plate along a first hinge line extending parallel to the attached reaction plate inner edge;

a stop member operatively connected between the reaction plate and at least one of the air bag dispenser and the vehicle panel, the stop member including a pin having an elongated shaft portion and a stop flange disposed at an inner distal end of the shaft portion, the shaft portion having a central longitudinal axis and a width measured across the shaft portion in a direction perpendicular to the axis, the stop flange extending integrally and radially outward from the shaft portion, the air bag dispenser including an elongated slot having a slot width slightly greater than that of the stop member shaft portion, the stop member shaft portion slidably disposed within the slot, the stop member movable between a stowed position and a deployed position under the force of an inflating air bag, the stop flange being engaged with the slot in the deployed position.

38. A passive supplemental restraint apparatus for an automotive vehicle, the apparatus comprising:

an interior vehicle panel;

an air bag deployment door integrally formed in the vehicle panel, the air bag deployment door having a perimeter, at least a portion of the perimeter defined by a frangible marginal edge;

an air bag dispenser supported adjacent a door inner surface opposite a door outer surface;

an air bag supported in an air bag receptacle of the air bag dispenser, the air bag having an inner end operatively connected to the air bag dispenser and an outer end disposed adjacent the air bag deployment door;

a reaction plate disposed between the air bag and the air bag deployment door, the frangible marginal edge defining the entire air bag deployment door perimeter, at least one rib extending integrally inward from the door inner surface to a point adjacent the reaction plate.

39. A passive supplemental restraint apparatus for an automotive vehicle, the apparatus comprising:

an interior vehicle panel;

an air bag deployment door integrally formed in the vehicle panel, the air bag deployment door having a perimeter, at least a portion of the perimeter defined by a frangible marginal edge;

an air bag dispenser supported adjacent a door inner surface opposite a door outer surface;

an air bag supported in an air bag receptacle of the air bag dispenser, the air bag having an inner end operatively connected to the air bag dispenser and an outer end disposed adjacent the air bag deployment door;

a reaction plate disposed between the air bag and the air bag deployment door, the frangible marginal edge defining the entire air bag deployment door perimeter, and a flexible tether fastened between the door and the reaction plate.

40. A passive supplemental restraint apparatus as defined in claim 39 in which the tether includes an inner end portion fastened to the door, an outer end portion fastened to the door and a middle portion fastened to the reaction plate, the middle portion of the tether disposed between the inner and outer end portions of the tether.

41. A passive supplemental restraint apparatus as defined in claim 39 in which the door includes a fastener bracket extending integrally inward toward the air bag dispenser from the door inner surface, the fastener bracket including an attachment surface spaced inwardly from the door inner surface, the tether attached to the attachment surface by a fastener.

42. A passive supplemental restraint apparatus as defined in claim 41 in which the fastener bracket includes a fastener aperture disposed through the attachment surface of the bracket and in which the fastener comprises a rivet having a shaft portion extending through the aperture.

43. A passive supplemental restraint apparatus as defined in claim 39 in which the tether is fastened to the door inner surface by at least one heat-staked pin, the pin extending integrally inward from the air bag deployment door.

44. A passive supplemental restraint apparatus as defined in claim 39 in which the tether is fastened to the door inner surface by a screw threaded into a boss, the boss extending integrally inward from the air bag deployment door.

45. A passive supplemental restraint apparatus for an automotive vehicle, the apparatus comprising:

an interior vehicle panel;

an air bag deployment door integrally formed in the vehicle panel, the air bag deployment door having a perimeter, at least a portion of the perimeter defined by a frangible marginal edge;

an air bag dispenser supported adjacent a door inner surface opposite a door outer surface;

an air bag supported in an air bag receptacle of the air bag dispenser, the air bag having an inner end operatively connected to the air bag dispenser and an outer end disposed adjacent the air bag deployment door;

a reaction plate disposed between the air bag and the air bag deployment door, the frangible marginal edge defining the entire air bag deployment door perimeter, the reaction plate being rigidly attached to the air bag dispenser and the vehicle panel along a reaction plate inner edge, an outer portion of the reaction plate being outwardly pivotable away from the air bag dispenser by bending the reaction plate along a first hinge line extending parallel to the rigidly attached reaction plate inner edge;

a flexible tether fastened between the door and the reaction plate; and a stop member operatively connected between the reaction plate and the air bag dispenser.

46. A passive supplemental restraint apparatus as defined in claim 45 in which:

the stop member is connected to the reaction plate at a stop point disposed between the first hinge line and a reaction plate outer marginal edge opposite the reaction plate inner edge;

the outer portion of the reaction plate is outwardly pivotable away from the air bag dispenser by bending the reaction plate along a second hinge line extending adjacent the stop point and generally parallel to the first hinge line, the second hinge line spaced between the first hinge line and the reaction plate outer marginal edge; and the tether is attached to the reaction plate between the second hinge line and the reaction plate outer marginal edge.

47. A passive supplemental restraint apparatus as defined in claim 46 in which:

the stop member includes a pin having an elongated shaft portion and a stop flange disposed at an inner distal end of the shaft portion, the shaft portion having a central longitudinal axis and a width measured across the shaft portion in a direction perpendicular to the axis, the stop flange extending integrally and radially outward from the shaft portion; and in which the air bag dispenser includes an elongated slot having a slot width slightly greater than that of the stop member shaft portion, the stop member shaft portion slidably disposed within the slot, the stop member movable between a stowed position and a deployed position under the force of an inflating air bag, the stop flange being engaged with the slot in the deployed position.

* * * * *